United States Patent
Connell et al.

(10) Patent No.: US 11,723,826 B2
(45) Date of Patent: Aug. 15, 2023

(54) PATIENT SUPPORT APPARATUS WITH FRAME GUARD

(71) Applicant: Stryker Corporation, Kalamazoo, MI (US)

(72) Inventors: Jason John Connell, London (CA); Jason James Cerny, London (CA); Jeffrey C. Shiery, East Leroy, MI (US); Joseph S. Elku, Tillsonburg (CA)

(73) Assignee: Stryker Corporation, Kalamazoo, MI (US)

( * ) Notice: Subject to any disclaimer, the term of this patent is extended or adjusted under 35 U.S.C. 154(b) by 209 days.

(21) Appl. No.: 16/944,462

(22) Filed: Jul. 31, 2020

(65) Prior Publication Data

US 2021/0030612 A1 Feb. 4, 2021

Related U.S. Application Data

(60) Provisional application No. 62/880,935, filed on Jul. 31, 2019.

(51) Int. Cl.
*A61G 7/10* (2006.01)
*A61G 7/05* (2006.01)
(Continued)

(52) U.S. Cl.
CPC ......... *A61G 7/1046* (2013.01); *A61G 5/1029* (2013.01); *A61G 7/0528* (2016.11);
(Continued)

(58) Field of Classification Search
CPC . B60B 17/0072; B60B 33/0089; B60B 33/04; B60B 2200/26; B60B 15/00;
(Continued)

(56) References Cited

U.S. PATENT DOCUMENTS 3,179,431 A 4/1965 Pikl
3,191,953 A 6/1965 Aysta
(Continued)

FOREIGN PATENT DOCUMENTS

DE 4419720 A1 * 1/1995 ............ A61G 5/046
EP 1772291 A1 4/2007

OTHER PUBLICATIONS

"Ground." Merriam-Webster, Merriam-Webster, www.merriam-webster.com/dictionary/ground.*
(Continued)

*Primary Examiner* — David R Hare
*Assistant Examiner* — Madison Emanski
(74) *Attorney, Agent, or Firm* — Howard & Howard Attorneys PLLC

(57) ABSTRACT

A patient support apparatus for traversing objects supported on ground surfaces. The patient support apparatus comprises a patient support deck, and a base to support the patient support deck from the ground surface. At pair of caster wheel assemblies spaced from each other are coupled to the base for pivoting movement about respective pivot axes cooperating to define a reference plane. A frame guard coupled to the base defines first and second ramp surfaces each disposed at an angle relative to the reference plane. The first ramp surface is arranged to engage objects before they contact one or more of the caster wheels when the patient support apparatus moves in a first direction. The second ramp surface is arranged to engage objects before they contact one or more of the caster wheels when the patient support apparatus moves in an opposite, second direction.

20 Claims, 33 Drawing Sheets

(51) Int. Cl.
*A61G 5/10* (2006.01)
*B62D 55/075* (2006.01)
*B62B 5/02* (2006.01)
*B62B 5/00* (2006.01)
*B60B 17/00* (2006.01)

(52) U.S. Cl.
CPC ......... *A61G 7/1034* (2013.01); *A61G 7/1055* (2013.01); *B62D 55/075* (2013.01); *A61G 2203/10* (2013.01); *A61G 2203/36* (2013.01); *A61G 2203/70* (2013.01); *B60B 17/0072* (2013.01); *B60B 2200/26* (2013.01); *B62B 5/0006* (2013.01); *B62B 5/02* (2013.01); *B62B 5/025* (2013.01); *Y10S 180/907* (2013.01); *Y10S 280/10* (2013.01); *Y10T 16/216* (2015.01); *Y10T 16/218* (2015.01)

(58) Field of Classification Search
CPC . B60B 33/00; B60B 2900/551; A61G 7/1046; A61G 7/0528; A61G 7/1034; A61G 2203/72; A61G 5/00; A61G 5/1029; A61G 2203/70; A61G 2203/723; A61G 5/06; A61G 5/061; A61G 2203/10; A61G 2203/36; A61G 13/104; B62D 31/12; B62D 55/075; B62B 5/02; B62B 5/025; B62B 5/049; B62B 5/00; B62B 5/0006; B62B 9/02; B62B 9/04; B62B 9/06; B62B 5/021; Y10S 280/10; Y10S 180/907; B25J 5/007; A47D 1/0081; A47D 13/043; A47D 3/001; Y10T 16/218; Y10T 16/216
USPC ............................................. 16/18 CG, 18 B
See application file for complete search history.

(56) References Cited

U.S. PATENT DOCUMENTS

| | | | |
|---|---|---|---|
| 6,029,982 A * | 2/2000 | Kakehi | B62D 57/00 180/908 |
| 7,398,571 B2 | 7/2008 | Souke et al. | |
| 8,438,677 B2 | 5/2013 | Biersteker | |
| 8,539,640 B1 | 9/2013 | Waggener | |
| 8,650,710 B1 | 2/2014 | Waggener | |
| 8,857,920 B2 | 10/2014 | Wollborg | |
| 8,910,344 B2 | 12/2014 | Nguyen et al. | |
| 9,486,373 B2 | 11/2016 | Lambarth et al. | |
| 9,510,981 B2 | 12/2016 | Lambarth et al. | |
| 2006/0113733 A1 * | 6/2006 | Kazaoka | A61G 5/06 280/5.24 |
| 2010/0294848 A1 | 11/2010 | Bullis | |
| 2018/0028383 A1 | 2/2018 | Stryker et al. | |

OTHER PUBLICATIONS

"Abutment." Collins-Dictionary, Collins, www.collinsdictionary.com/us/dictionary/english/abutment.*
Alibaba, "Electric Stair Climbing Wheelchair Price with Three Big Wheels for Old People", 2019, https://ggatc.en.alibaba.com/product/60612659679-805028073/Electric_stair_climbing_wheelchair_price_with_three_big_wheels_For_Old_People_And_Emer.html, 9 pages.
Cherry's Industrial Equipment, "Roller Skids and Machinery Rollers Webpage", 2019, https://www.material-handling.com/roller-skids.html/, 9 pages.
Cyberneticzoo, "1964c—Walking Wheel Stair Climbers—Meredith Thring (British)", Jun. 1967, http://cyberneticzoo.com/walking-machines/1964c-walking-wheel-stair-climbers-meredith-thring-british/, 12 pages.
Global Industrial, "Steel Stair Climbing Hand Truck ST-TRUCK-300—300 Lb. Capacity", https://www.globalindustrial.com/p/material-handling/hand-trucks-dollies/hand-trucks-steel/steel-stair-climbing-hand-truck-300-lb-capacity?infoParam.campaignId=T9F&gclid=EAIaIQobChMIi-nd1qOM4wIV2rjACh1s_QPHEAQYBCABEgL4RPD_BwE , 5 pages.
Maker Works, "Reinventing the Wheelchair: Making the First Human-Powered, Stair-Climbing Wheelchair", Aug. 20, 2015, http://web.archive.org/web/20150926003250/http://maker-works.com/reinventing-the-wheelchair-making-the-first-human-powered-stair-climbing-wheelchair/, 3 pages.
Robot Mesh, "VEX 6" Wheel Legs", 2019, https://store.robotmesh.com/vex-6inch-wheel-legs, 3 pages.
RV Mount Shop, "Hitch Mount 4" Rigid Skid Wheel", 2019, https://rvpartshop.ca/product/skid-wheels/7491-ultra-fab-hitch-mount-4-in-rigid-skid-wheel-48-979015.html, 11 pages.
The Enablist, "IIT Kanput Designs Convertible, Stair Climbing Wheelchair", 2012, http://theenablist.blogspot.com/2012/11/iit-kanpur-designs-convertible-stair.html, 3 pages.
Wikipedia, "Omni Wheel", 2019, https://en.m.wikipedia.org/wiki/Omni_wheel, 4 pages.
Wikipedia, "Pedrail Wheel", https://en.wikipedia.org/wiki/Pedrail_wheel, 2019, 3 pages.
Yongkang Jinding Machine Electricity Co. Ltd, "Stair-Climbing Cart", 2015, https://www.globalsources.com/si/AS/Yongkang-Jinding/6008847958447/pdtl/Stair-climbing-Cart/1140620092.htm, 3 pages.
Youtube, "Fablab Stair-Climbing Robot Video", Jul. 15, 2013, https://www.youtube.com/watch?v=S1VzpJGIM90, 6 pages.

* cited by examiner

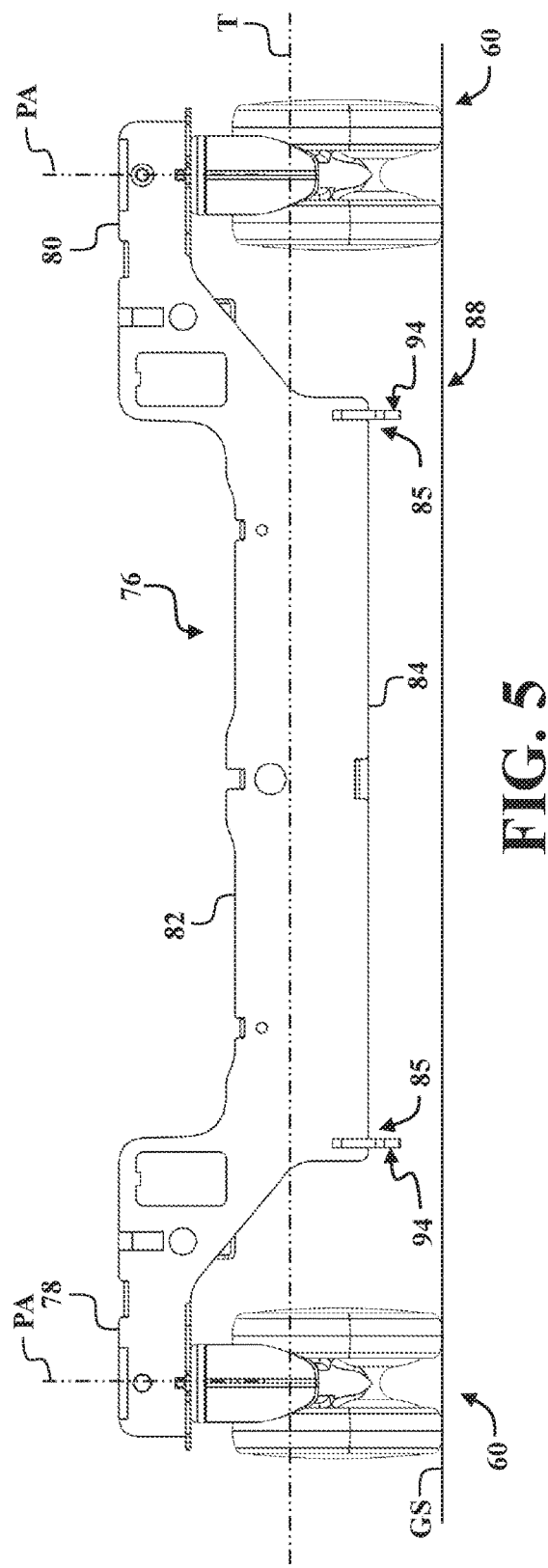
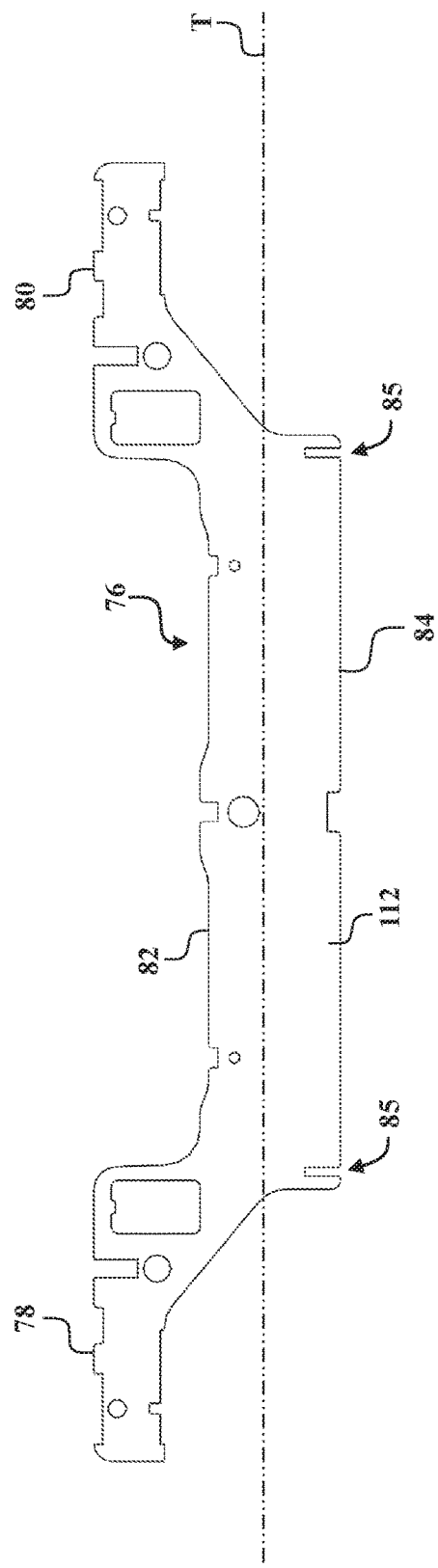
FIG. 5
FIG. 6

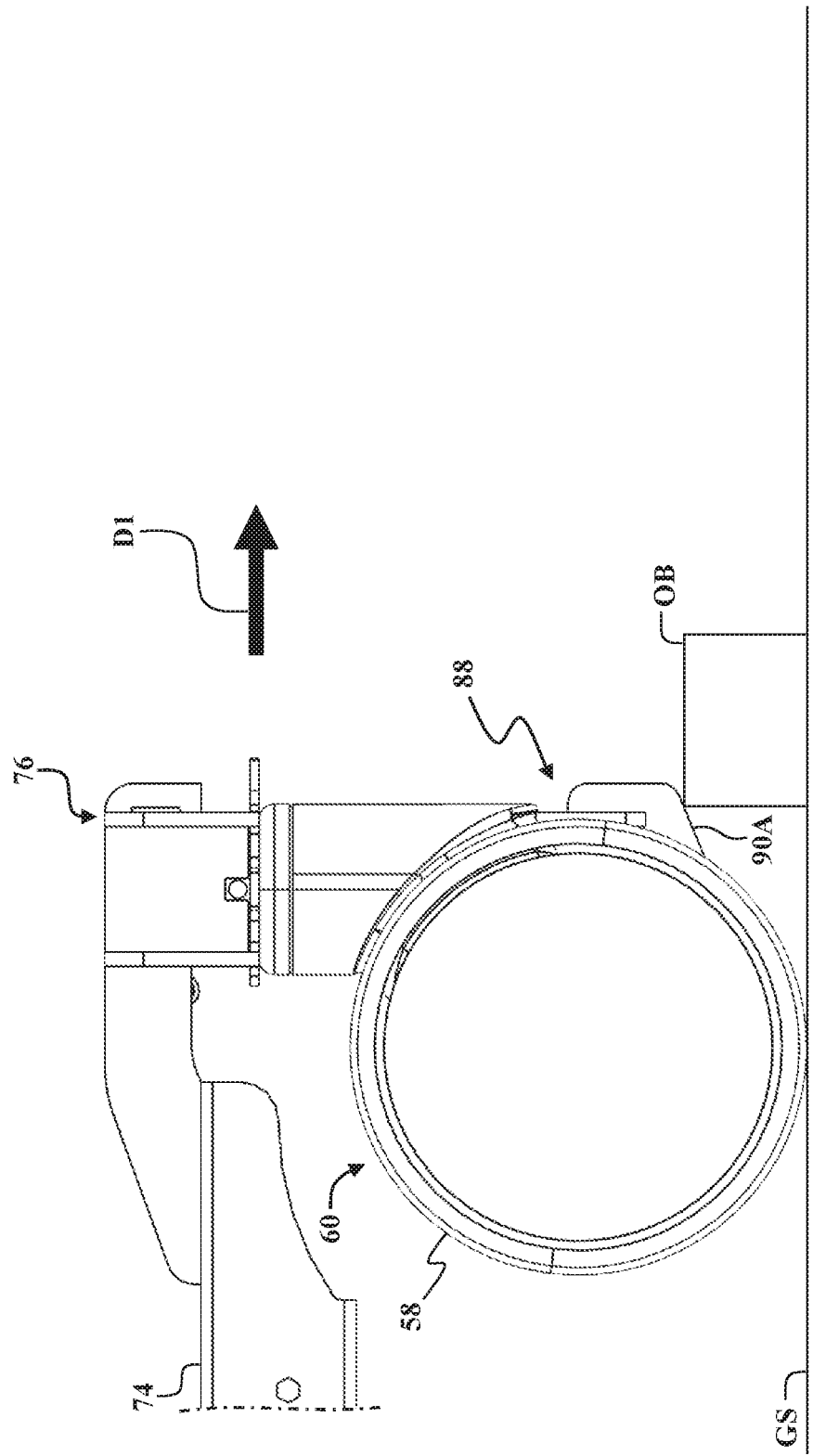

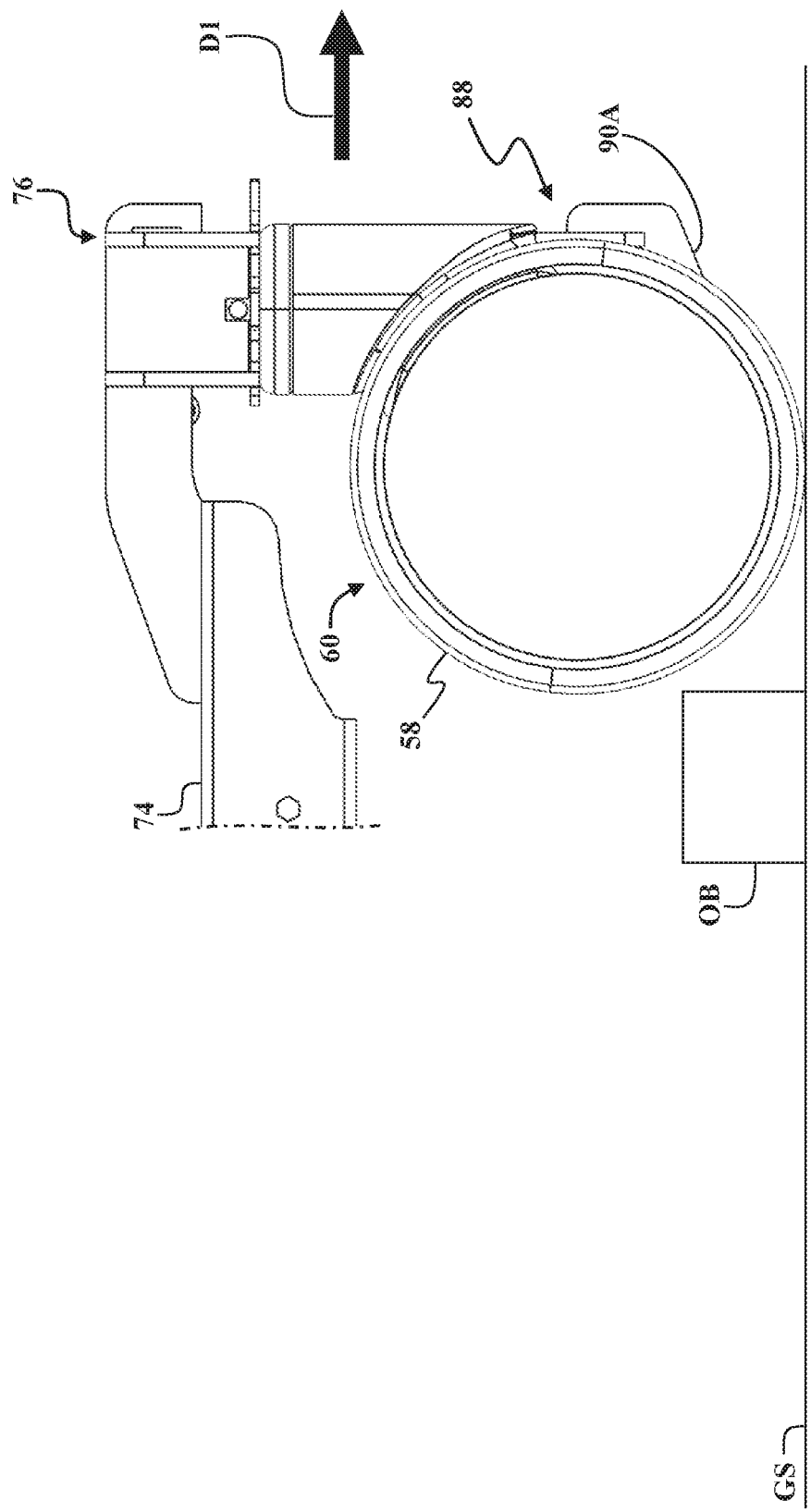

PATIENT SUPPORT APPARATUS WITH FRAME GUARD

CROSS-REFERENCE TO RELATED APPLICATION

The subject patent application claims priority to and all the benefits of U.S. Provisional Patent Application No. 62/880,935 filed on Jul. 31, 2019, the disclosure of which is hereby incorporated by reference in its entirety.

BACKGROUND

Patient support apparatuses, such as hospital beds, stretchers, cots, tables, and wheelchairs, facilitate care of patients in a health care setting. Conventional patient support apparatuses comprise a base, a support frame, and a patient support deck upon which the patient is supported. Bariatric patient support apparatuses are generally designed to support heavier weight loads than conventional patient support beds. Certain conventional bariatric patient support apparatuses include caster wheels mounted to the support frames. When moving the bariatric patient support apparatuses, the caster wheels and/or support frames may become damaged when contacted by obstructions on the floor (i.e. thresholds doorsills, door saddles, or threshold transition between uneven floors differing height). The concern of incurring severe or catastrophic damage to the casters when encountering an ascending step obstruction is significantly increased because of high inertia from the very heavy patient weight and the heavy weight of the bariatric patient support apparatus.

A patient support apparatus with an additional assembly designed to overcome one or more of the aforementioned disadvantages is desired.

BRIEF DESCRIPTION OF THE DRAWINGS

FIG. 5 is a front elevation view of the support structure shown in FIG. 3.

FIG. 6 is a front elevation view of a cross support member used with the support structure shown in FIG. 3.

FIGS. 13A-13G are side elevation views of the support structure shown in FIG. 3, illustrating movement of the patient support apparatus and engagement with an object supported on a ground surface.

DETAILED DESCRIPTION

Figure 1:
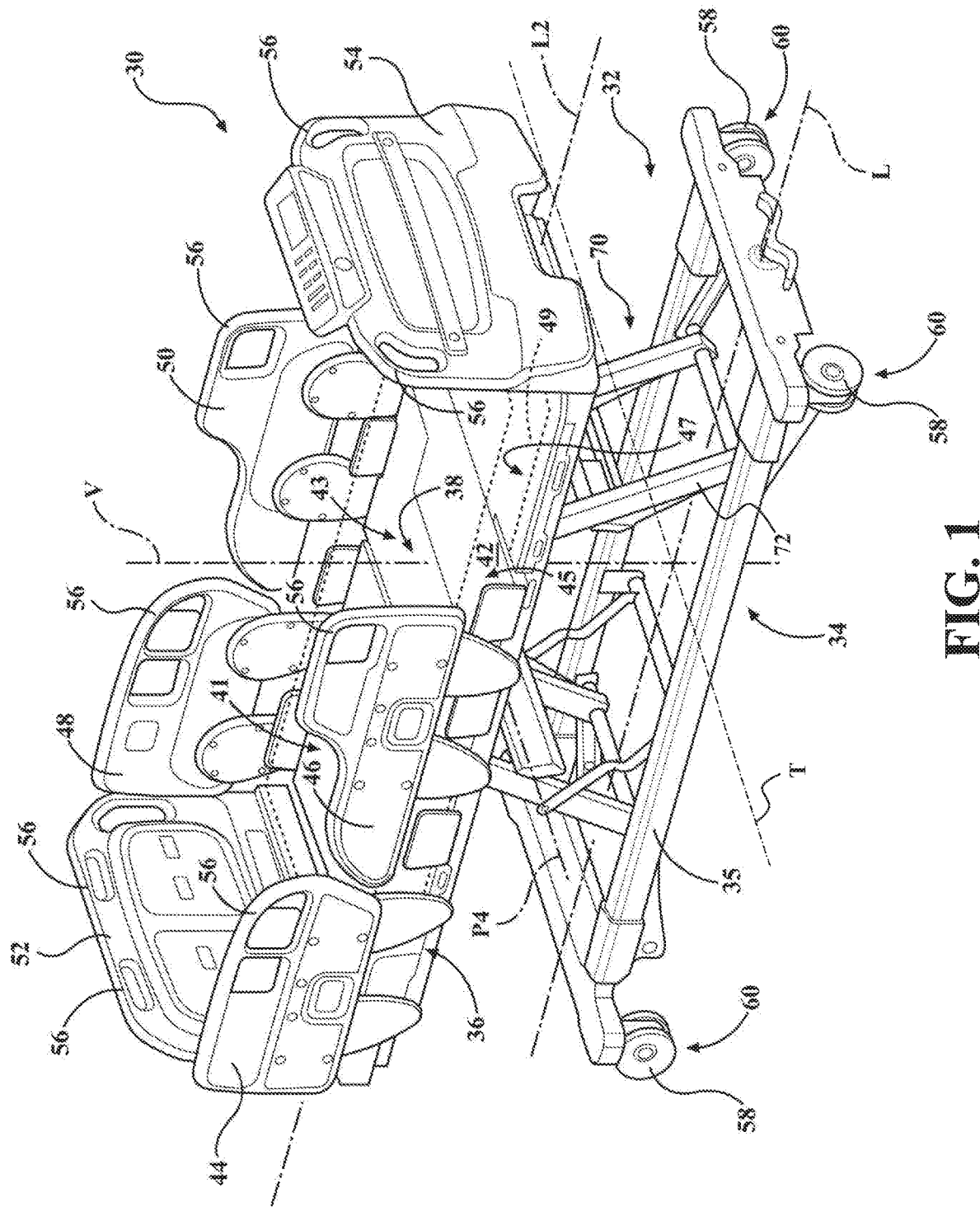
FIG. 1 is a perspective view of a patient support apparatus.

Referring to FIG. 1, a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, or similar apparatus utilized in the care of a patient.

A support structure 32 provides support for the patient. The support structure 32 illustrated in FIG. 1 comprises a base 34 and a deck support frame 36. The base 34 comprises a base frame assembly 35. The deck support frame 36 is spaced above the base frame assembly 35 in FIG. 1. The support structure 32 also comprises a patient support deck 38 disposed on the deck support frame 36. The patient support deck 38 comprises several sections, some of which are pivotable relative to the deck support frame 36, such as a back section 41, a seat section 43, a leg section 45, and a foot section 47. The patient support deck 38 provides a patient support surface 42 upon which the patient is supported.

A mattress 49 (shown in hidden lines in FIG. 1) is disposed on the patient support deck 38 during use. The mattress 49 comprises a secondary patient support surface upon which the patient is supported. The base 34, deck support frame 36, patient support deck 38, and patient support surfaces 42 each have a head end and a foot end corresponding to designated placement of the patient's head and feet on the patient support apparatus 30. The base 34 comprises a longitudinal axis L along its length from the head end to the foot end. The base 34 also comprises a vertical axis V arranged crosswise (e.g., perpendicularly) to the longitudinal axis L along which the deck support frame 36 is lifted and lowered relative to the base 34.

A lift device 70 may be coupled to the base 34 and the deck support frame 36 to raise and lower the deck support frame 36 to minimum and maximum heights of the patient support apparatus 30, and intermediate positions therebetween. The lift device 70 includes one or more lift arms 72 coupling the deck support frame 36 to the base 34. The lift device 70 includes one or more lift actuators that are coupled to at least one of the base 34 and the deck support frame 36 to raise and lower the deck support frame 36 and patient support deck 38 relative to the floor surface and the base 34. The lift device 70 may be configured to operate in the same manner or a similar manner as the lift mechanisms shown in U.S. Pat. Nos. 7,398,571, 9,486,373, 9,510,981, and/or U.S. Patent Application Publication No. 2018/0028383, hereby incorporated herein by reference.

The deck support frame 36 comprises a second longitudinal axis L2 along its length from the head end to the foot end. The construction of the support structure 32 may take on any known or conventional design, and is not limited to that specifically set forth above. In addition, the mattress 49 may be omitted in certain embodiments, such that the patient rests directly on the patient support surface 42.

Side rails 44, 46, 48, 50 are coupled to the deck support frame 36 and thereby supported by the base 34. A first side rail 44 is positioned at a right head end of the deck support frame 36. A second side rail 46 is positioned at a right foot end of the deck support frame 36. A third side rail 48 is positioned at a left head end of the deck support frame 36. A fourth side rail 50 is positioned at a left foot end of the deck support frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In still other configurations, the patient support apparatus 30 may not include any side rails.

A headboard 52 and a footboard 54 are coupled to the deck support frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Other forms of the caregiver interface 56 are also contemplated. The caregiver interface 56 may comprise one or more handles coupled to the deck support frame 36. The caregiver interface 56 may simply be a surface on the patient support apparatus 30 upon which the caregiver applies force to cause movement of the patient support apparatus 30 in one or more directions, also referred to as a push location. This may comprise one or more surfaces on the deck support frame 36 or base 34. This could also comprise one or more surfaces on or adjacent to the headboard 52, footboard 54, and/or side rails 44, 46, 48, 50. In other embodiments, the caregiver interface may comprise separate handles for each hand of the caregiver. For example, the caregiver interface may comprise two handles. It will also be appreciated that caregiver interfaces 56 may also be operatively attached to the base 34 (e.g., to the base frame 35). Other configurations are contemplated.

Wheels 58 are coupled to the base 34 to facilitate transport over the floor surfaces. In the illustrated embodiment, wheels 58 are arranged in each of four quadrants of the base 34 adjacent to corners of the base 34. In the embodiments shown, the wheels 58 are caster wheels able to rotate and swivel relative to the support structure 32 during transport. Each of the wheels 58 forms part of a caster wheel assembly 60. Each caster wheel assembly 60 is mounted to the base 34. It should be understood that various configurations of the caster wheel assemblies 60 are contemplated. In addition, in some embodiments, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster wheel assemblies 60 and contact the floor surface in the deployed position, they cause two of the caster wheel assemblies 60 to be lifted off the floor surface thereby shortening a wheel base of the patient support apparatus 30. A fifth wheel may also be arranged substantially in a center of the base 34.

Figure 2:
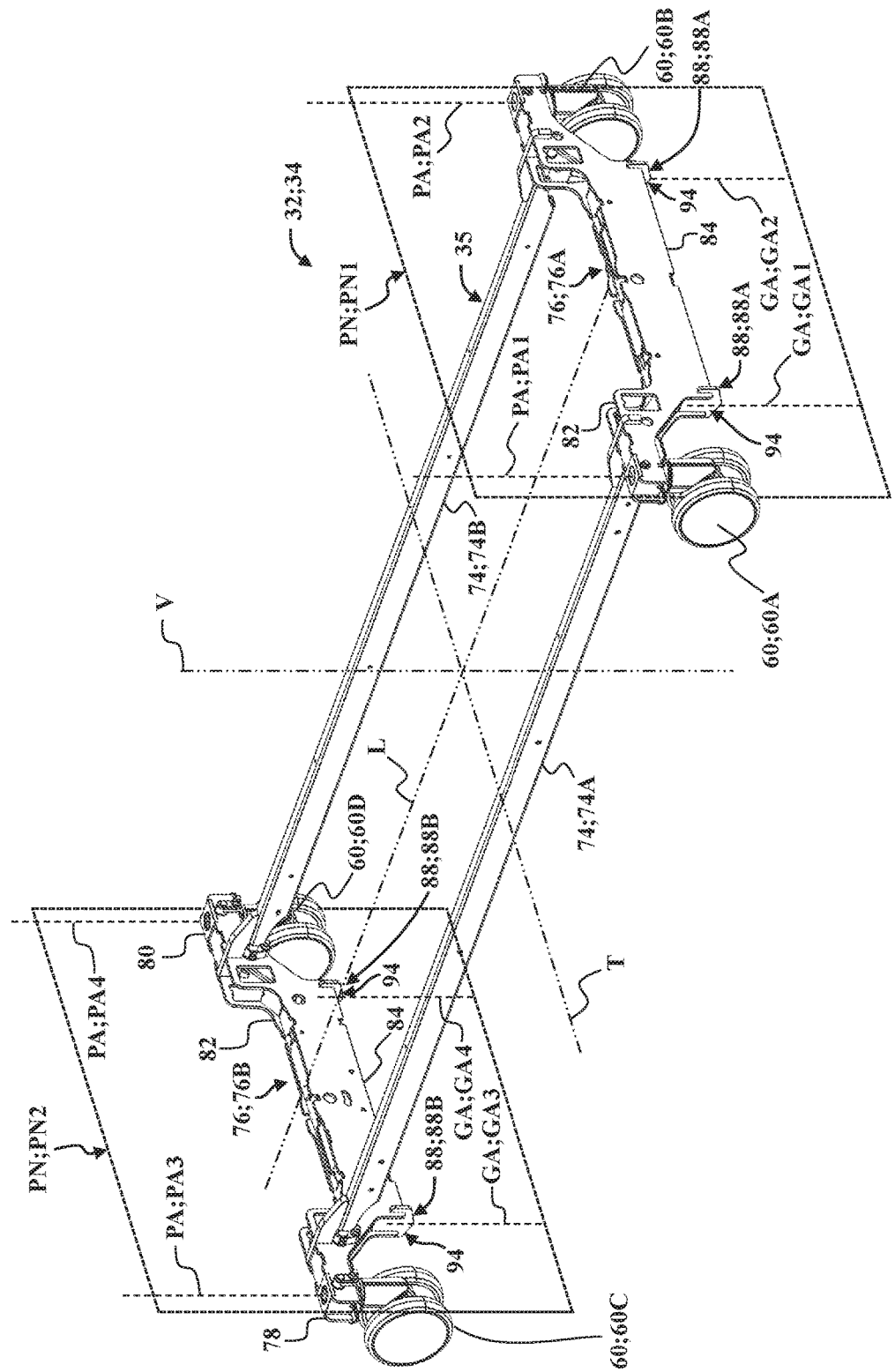
FIG. 2 is a perspective view of a support structure of the patient support apparatus of FIG. 1.

Referring now to FIG. 2, portions of the support structure 32 are shown. The base 34 of the support structure 32 is configured to support the patient support deck 38 (see FIG. 1) from a ground surface GS. The illustrated base frame assembly 35 includes longitudinal support members 74 and cross support members 76. More specifically, the base 34 comprises first and second longitudinal support members 74A, 74B and first and second cross support members 76A, 76B (see FIG. 2). Each longitudinal support member 74 extends generally along (e.g., parallel to) the longitudinal axis L. The cross support members 76 are coupled between the longitudinal support members 74 and extend generally along (e.g., parallel to) a transverse axis T that is perpendicular to the longitudinal axis L. Each cross support member 76 generally extends between a first end 78 and a second end 80 and includes an upper portion 82 and a lower portion 84 defined between the first and second ends 78, 80. As is described in greater detail below, one or more slots 85 (see FIG. 6) may be defined or otherwise formed along the lower portions 84 of the cross support members 76.

Figure 3:
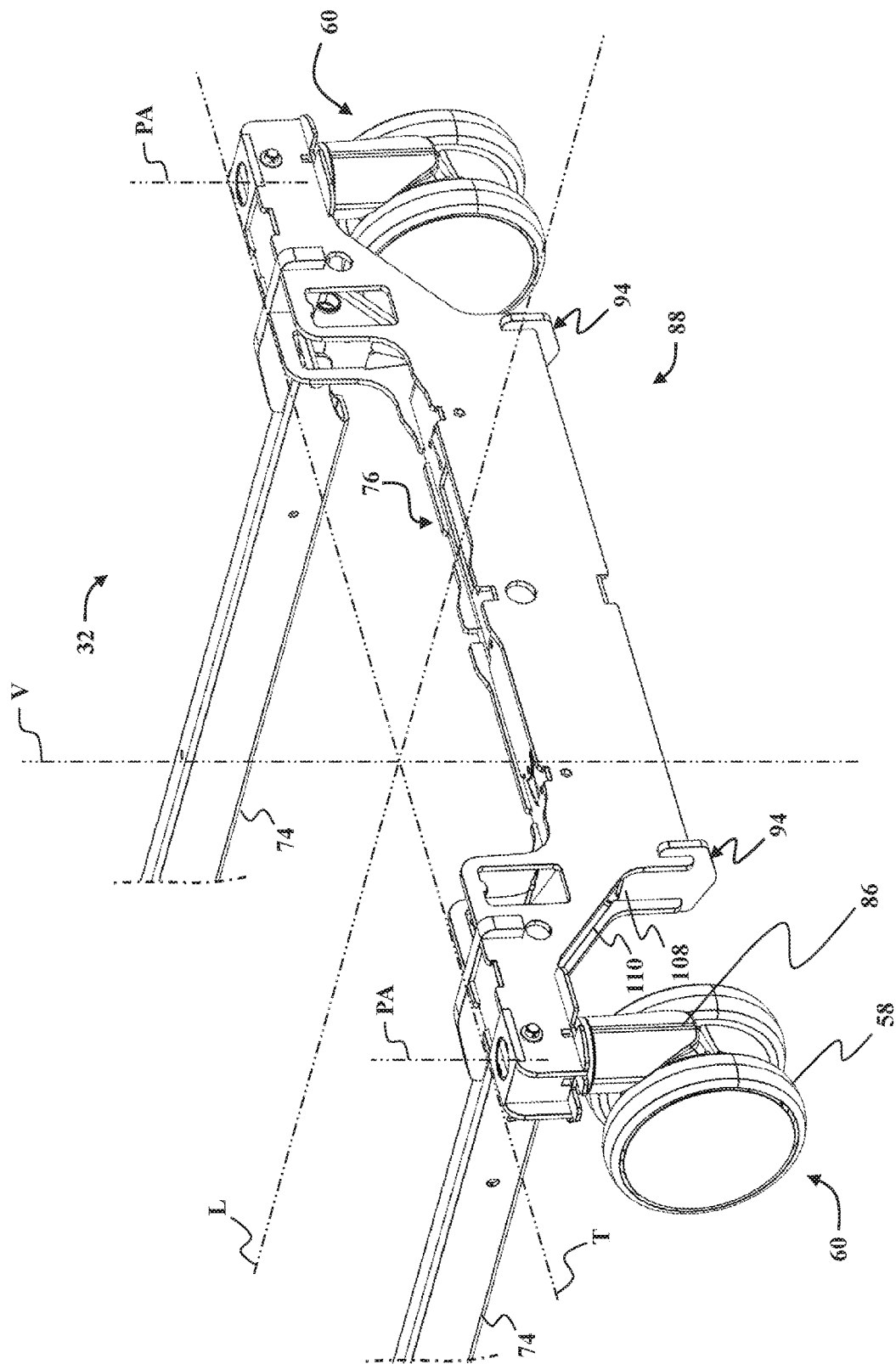
FIGS. 3 and 4 are enlarged perspective views of the support structure shown in FIG. 2 illustrating a frame guard.
Figure 4:
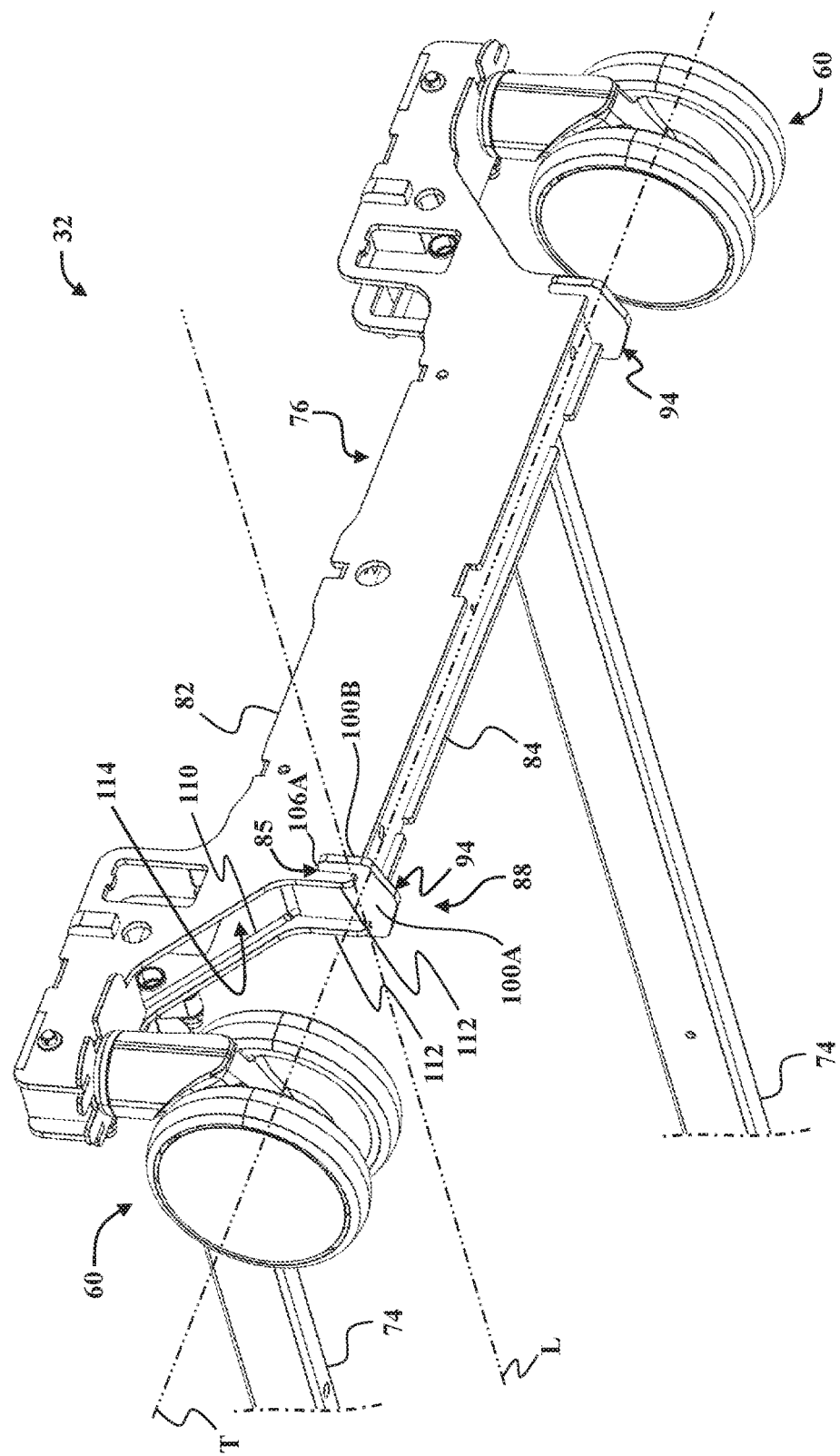
Figure 7:
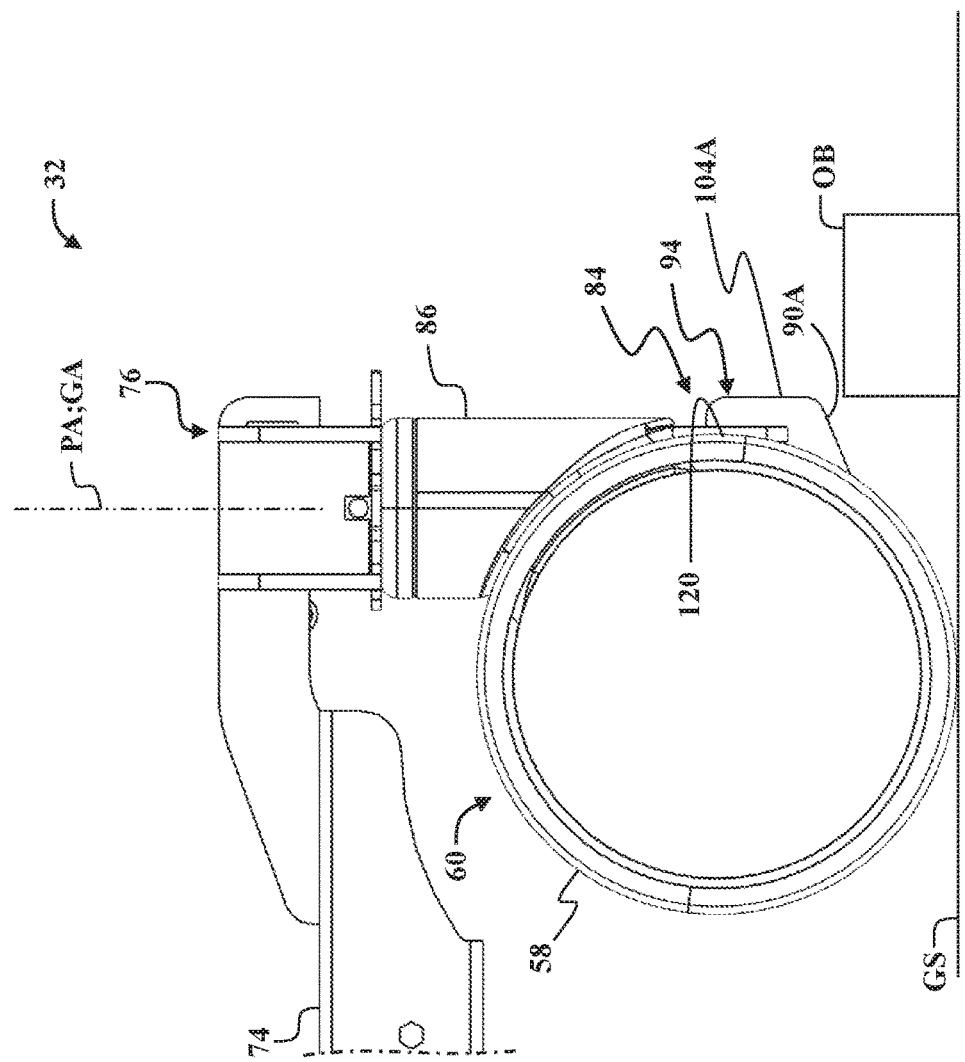
FIG. 7 is a side elevation view of the support structure shown in FIG. 3 illustrating a caster wheel assembly and the frame guard.

Caster wheel assemblies 60 are coupled adjacent to the first and second ends 78, 70 of each of the cross support members 76A, 76B such that the caster wheels 58 support the patient support apparatus 30 from the ground surface. Each caster wheel assembly 60 includes a caster wheel 58 that is rotatably coupled to a caster stem 86 (see FIG. 3) which, in turn, is rotatably coupled to the base 34 (e.g., to one of the cross support members 76) for pivoting movement about respective pivot axes PA which are arranged substantially parallel to the vertical axis V.

With continued reference to FIG. 2, the patient support apparatus 30 comprises a plurality of caster wheel assemblies 60, including at least one pair of caster wheel assemblies 60 that are spaced laterally (e.g., along the transverse axis T or along an axis parallel thereto) from each other and are coupled to the base 34 for pivoting movement about respective pivot axes PA cooperating to define a reference plane PN1. More specifically, in the representative embodiments illustrated herein, the patient support apparatus 30 comprises a first pair of caster wheel assemblies 60A, 60B that are spaced laterally from each other and are coupled to the base 34 for pivoting movement about respective pivot axes PA1, PA2 cooperating to define a first reference plane PN1, and a second pair of caster wheel assemblies 60C, 60CD that are likewise spaced laterally from each other and are coupled to the base 34 for pivoting movement about respective pivot axes PA3, PA4 cooperating to define a second reference plane PN2. However, other configurations of caster wheel assemblies 60 are contemplated by the present disclosure.

Referring now to FIGS. 1-13F, those having ordinary skill in the art will appreciate that patient support apparatuses 30 may frequently encounter certain types of objects OB during movement along ground surfaces GS within healthcare facilities (e.g., hospitals) and other environments, including for example objects OB defined by thresholds, doorsills, door saddles, transitions between floors differing in height, ascending step obstructions, and the like. Here, patient support apparatuses 30 may need to be capable of traversing objects OB defined by certain parameters (e.g., a 40 mm tall threshold). It will be appreciated that traversing these types of objects OB generally results in force being applied to the caster wheel assembly 60 as the object OB is initially contacted, which also results in vertical movement of the patient support apparatus 30 relative to the ground surface GS as the object OB passes under the wheels 58. In certain applications, encountering these types of objects OB can place a significant amount of stress on the caster wheel assemblies 60 and other parts of patient support apparatuses 30. Here, the concern of incurring severe or catastrophic damage to caster wheel assemblies 60 may increase when encountering objects OB of relatively high heights relative to the ground surface GS, and/or when the patient support apparatus 30 is moving with relatively high inertia resulting from transporting a heavy patient (e.g., with bariatric bed applications) and/or at a relatively high movement speed. As is described in greater detail below, embodiments of the present disclosure employ one or more frame guards 88 (also referred to as frame guard assemblies 88) which afford protection to caster wheel assemblies 60 (e.g., the caster wheels 58, the caster stems 86, and the like of respective lateral pairs of caster wheel assemblies 60) from potential damage that could otherwise occur when encountering an object OB. Furthermore, the frame guards 88 also afford protection to the various portions of the base 34 (e.g., the base frame assembly 35) to which the caster wheel assemblies 60 are coupled by preventing excessive torsion, twisting, and/or angular loading of the base 34 that might otherwise be transferred thereto from the caster wheel assembly 60 (e.g., from the stem of the caster wheel assembly 60).

The frame guard 88 is coupled to the base 34 as described in greater detail below, and defines first and second ramp surfaces 90A, 90B (see FIGS. 3-4 and 8-9) that are each disposed at an angle 92A, 92B (see FIG. 11) relative the reference plane PN (see FIG. 2). More specifically, the first and second ramp surfaces 90A, 90B are each disposed at respective angles 92A, 92B relative to a guard axis GA arranged along the reference plane PN (see FIG. 2), with the first ramp surface 90A arranged to engage an object OB (see FIG. 13B) before the object OB contacts one or more of the caster wheels 58 when the patient support apparatus 30 moves in a first direction D1, and with the second ramp surface 90B arranged to engage an object OB (see FIG. 13G) before the object OB contacts one or more of the caster wheels 58 when the patient support apparatus 30 moves in a second direction D2 opposite to the first direction D1. While of the components introduced above will be described in greater detail below, it will be appreciated that the embodiments of the frame guard 88 of the present disclosure afford significant protection to the caster wheel assemblies 60 by, among other things, bearing the brunt of any impact of the base 34 (e.g., a part of the base frame assembly 35) against an object OB (e.g., a 40 mm door threshold) before any part of the caster wheel assembly 60 encounters it. Here, and as will be appreciated from the subsequent description below, the specific geometry of one or more components of the frame guard 88 can be adjusted and optimized for various types of objects OB (e.g., objects OB of various heights) that need to be accommodated for certain applications.

It will be appreciated that the first and second ramp surfaces 90A, 90B serve as a "leading edge" to engage against objects OB of specific parameters (e.g., of predetermined heights), and are shaped and arranged in such a way that the frame guard 88 not only bears the brunt of the initial impact with the object OB (see FIGS. 13B and 13G) but also affords a lead-in to provide mechanical lift of the patient support apparatus 30 (see FIGS. 13C-13D) which diverts and re-directs impact force resulting from engagement with the object OB. In some embodiments, such as the alternative embodiment depicted in FIG. 12, the first and second ramp surfaces 90A, 90B could be arranged tangential to the outer diameter of the caster wheel 58 (see FIG. 12). Put differently, in some embodiments, the first ramp surface 90A could be arranged so as to be substantially tangential to one of the caster wheels 58 of a pair of laterally-spaced caster wheel assemblies 60 when the patient support apparatus 30 moves in the first direction D1 (see FIG. 12). Here too, the second ramp surface 90B may be arranged so as to be substantially tangential to one of the caster wheels 58 of a pair of laterally-spaced caster wheel assemblies 60 when the patient support apparatus 30 moves in the second direction D2 (not shown). Other configurations are contemplated.

Irrespective of the specific configuration of the frame guard 88, it will be appreciated that if the rate of travel and inertia is sufficiently high (e.g., resulting from relatively high inertia such as with bariatric beds supporting bariatric patients), the patient support apparatus 30 will still move in its original direction of travel (e.g., the first direction D1) but the base 34 and respective caster wheels 58 will ride up and "skid" over the object OB (sequentially compare FIGS. 13A-13E). This enables contact of the caster wheel 58 against the object OB to occur in a significantly more controlled and safe manner, and allows subsequent movement of the patient support apparatus 30 to continue or otherwise resume after the object OB has been traversed, all while promoting significantly reduced impact shock and without incurring any damage to the caster wheel assemblies 60. Moreover, because the frame guard 88 of the illustrated embodiments is symmetrically mirrored about the guard axis GA which, as noted above, is aligned with the pivot axes PA of the pair of caster wheel assemblies 60 in the reference plane PN (see FIG. 2), movement in the first direction D1 results in the first ramp surface 90A being "ahead" of the caster wheel 50 (see FIG. 13A) while movement in the second direction D2 results in the second ramp surface 90B being "ahead" of the same caster wheel 58 (see FIG. 13F). Put differently, one of the first and second ramp surfaces will engage the object OB before the caster wheel 58 irrespective of whether the patient support apparatus 30 is moved in the first direction D1 (e.g., "forward") or the second direction D2 (e.g., "backward").

In certain embodiments of the present disclosure, such as is depicted in FIG. 2, the patient support apparatus 30 comprises a first frame guard 88A arranged laterally between a first pair of caster wheel assemblies 60A, 60B, and a second frame guard 88B arranged laterally between a second pair of caster wheel assemblies 60C, 60D. While the representative embodiments of the frame guards 88 illustrated throughout the drawings are arranged in an "inboard" fashion so as to be disposed between a pair of laterally-spaced caster wheel assemblies 60, it will be appreciated that other configurations are contemplated, and one or more frame guards 88 could be arranged in an "outboard" fashion (e.g., adjacent to a caster wheel assembly 60).

In certain embodiments illustrated throughout the drawings (see FIGS. 2-13G), the frame guard 88 comprises a guard member, generally indicated at 94, which is arranged laterally between a pair of caster wheel assemblies 60. More specifically, in the representative embodiment depicted in FIG. 2, the first and second frame guards 88A, 88B each comprise a respective pair of guard members 94 that are spaced from each other and are arranged laterally between the corresponding pairs of caster wheel assemblies 60. Put differently, four guard members 94 may be employed, one arranged adjacent to each caster wheel assembly 60. Here, each guard member 94 comprises respective first and second ramp surfaces 90A, 90B arranged at the first and second angles 92A, 92B relative to the respective guard axes GA1, GA2, GA3, GA4, and is disposed adjacent to a respective one of the illustrated caster wheel assemblies 60A, 60B, 60C, 60D. However, as noted above and as will be appreciated from the subsequent description below, other configurations of frame guards 88 are contemplated, and different arrangements of various quantities of guard members 94 could be utilized. Furthermore, at least one of the guard members 94 may define the first and second ramp surfaces 90A, 90B of the frame guard 88 in certain embodiments. However, other configurations are contemplated.

Figure 8:
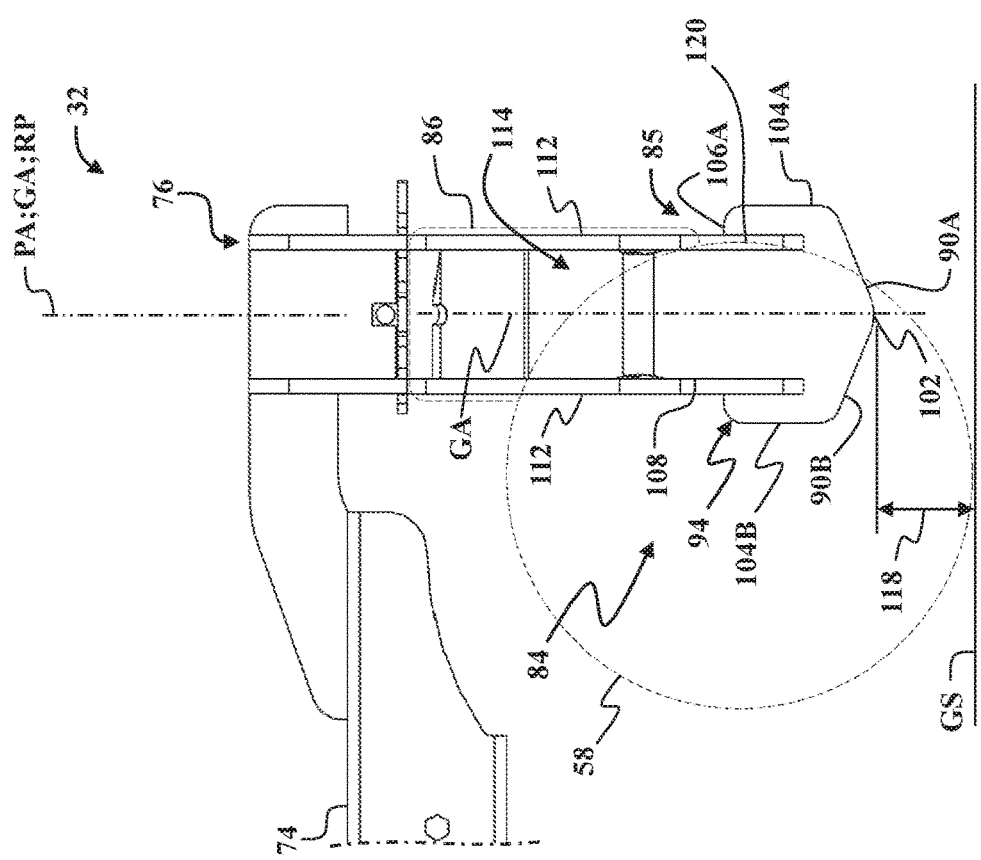
FIG. 8 is the side elevation view shown in FIG. 7 with the caster wheel assembly shown in phantom.
Figure 9:
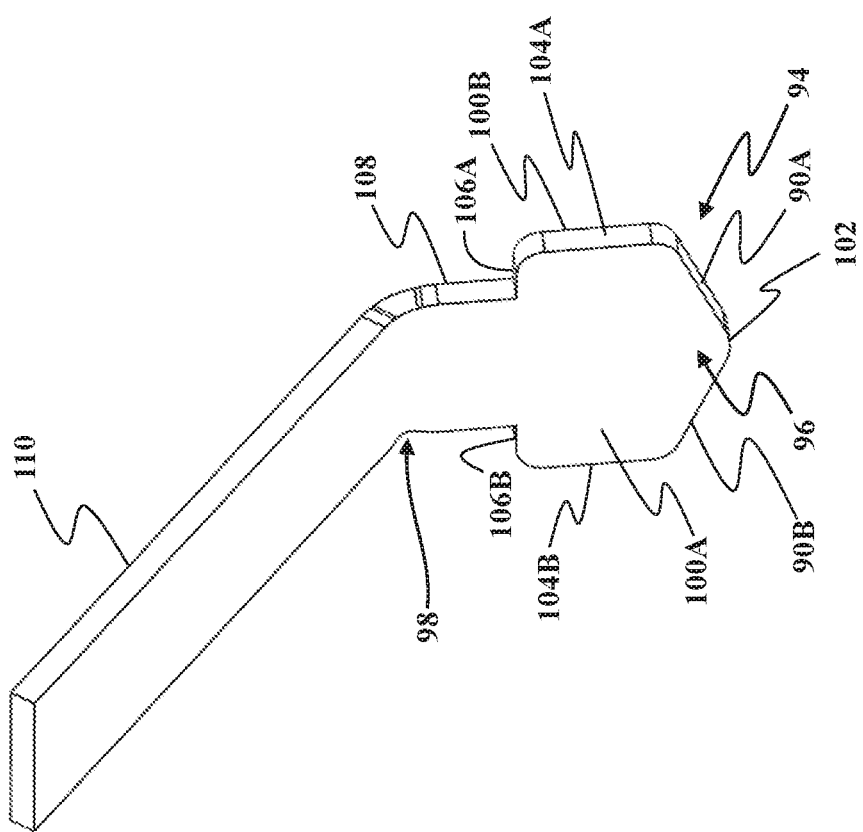
FIG. 9 is a perspective view of a guard member used with the frame guard of FIG. 3.
Figure 11:
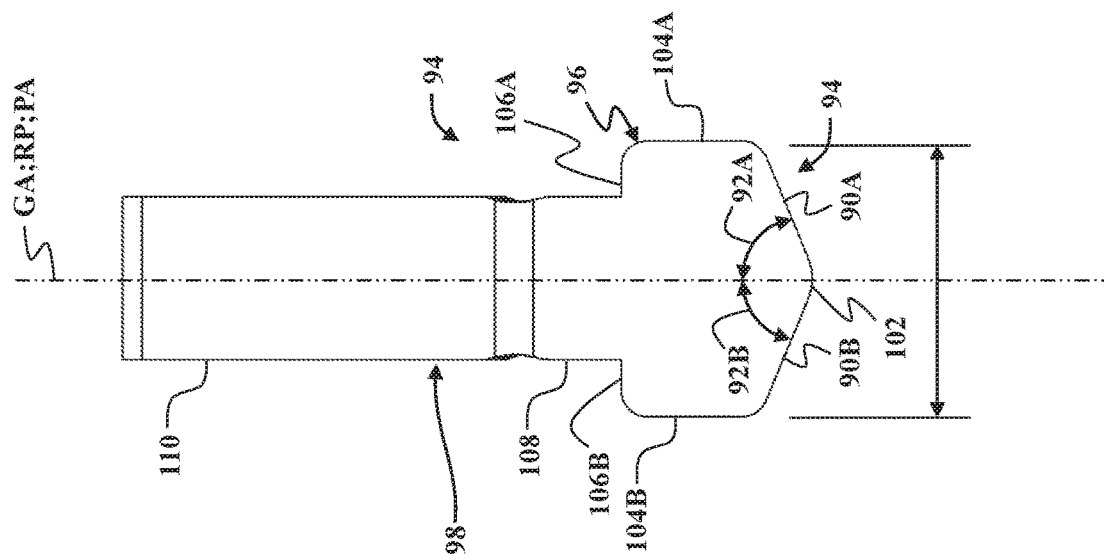
FIG. 11 is a front view of the guard member shown in FIG. 9.
Figure 10:
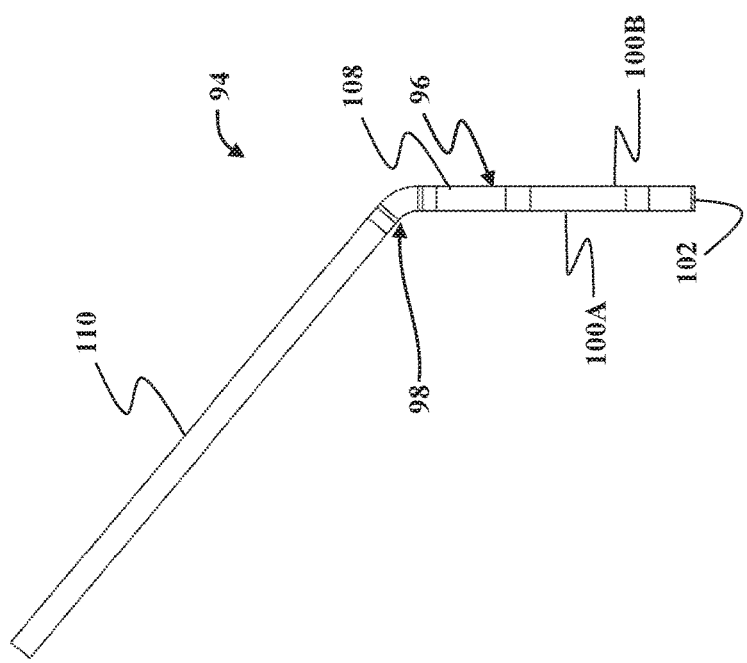
FIG. 10 is a side view of the guard member shown in FIG. 9.
Figure 12:
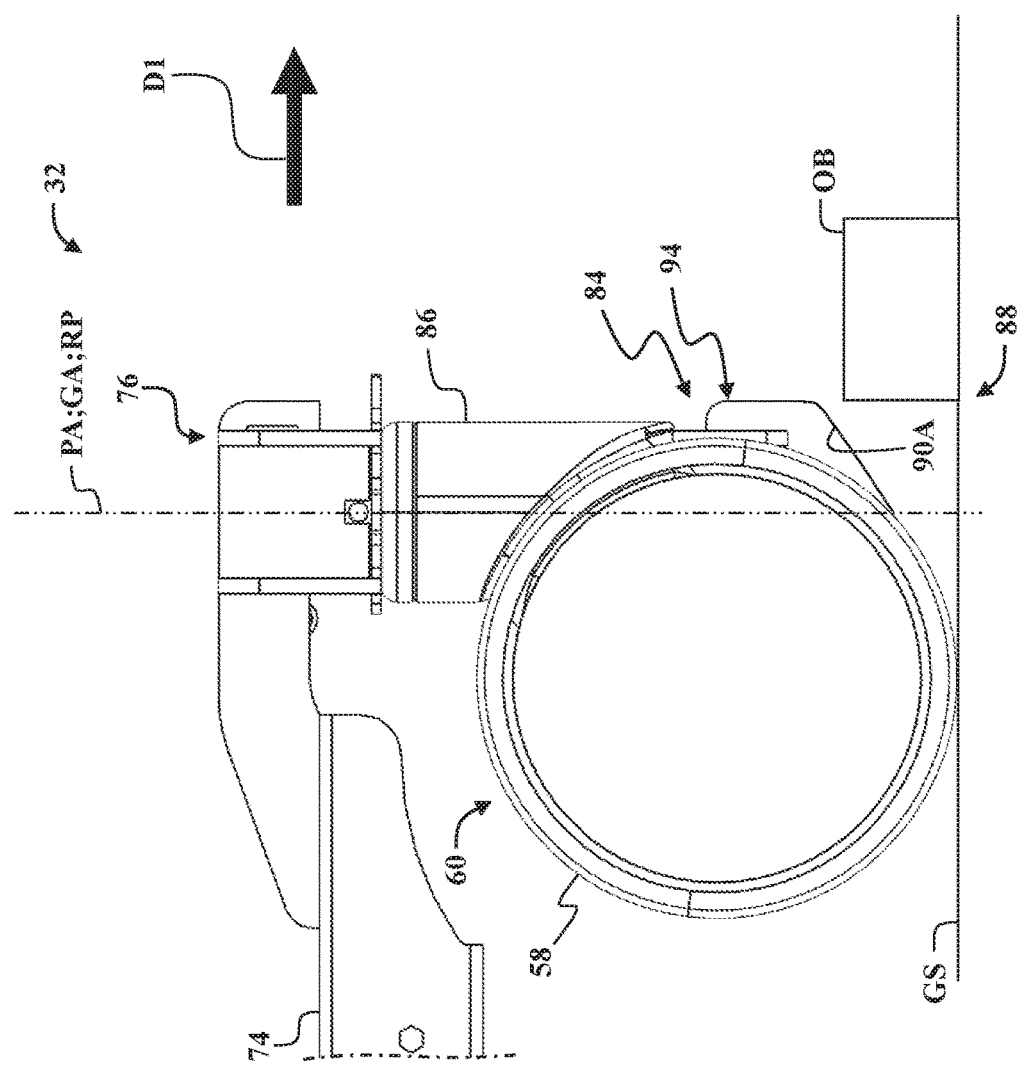
FIG. 12 is another side elevation view of the support structure shown in FIG. 3.
Figure 13A:
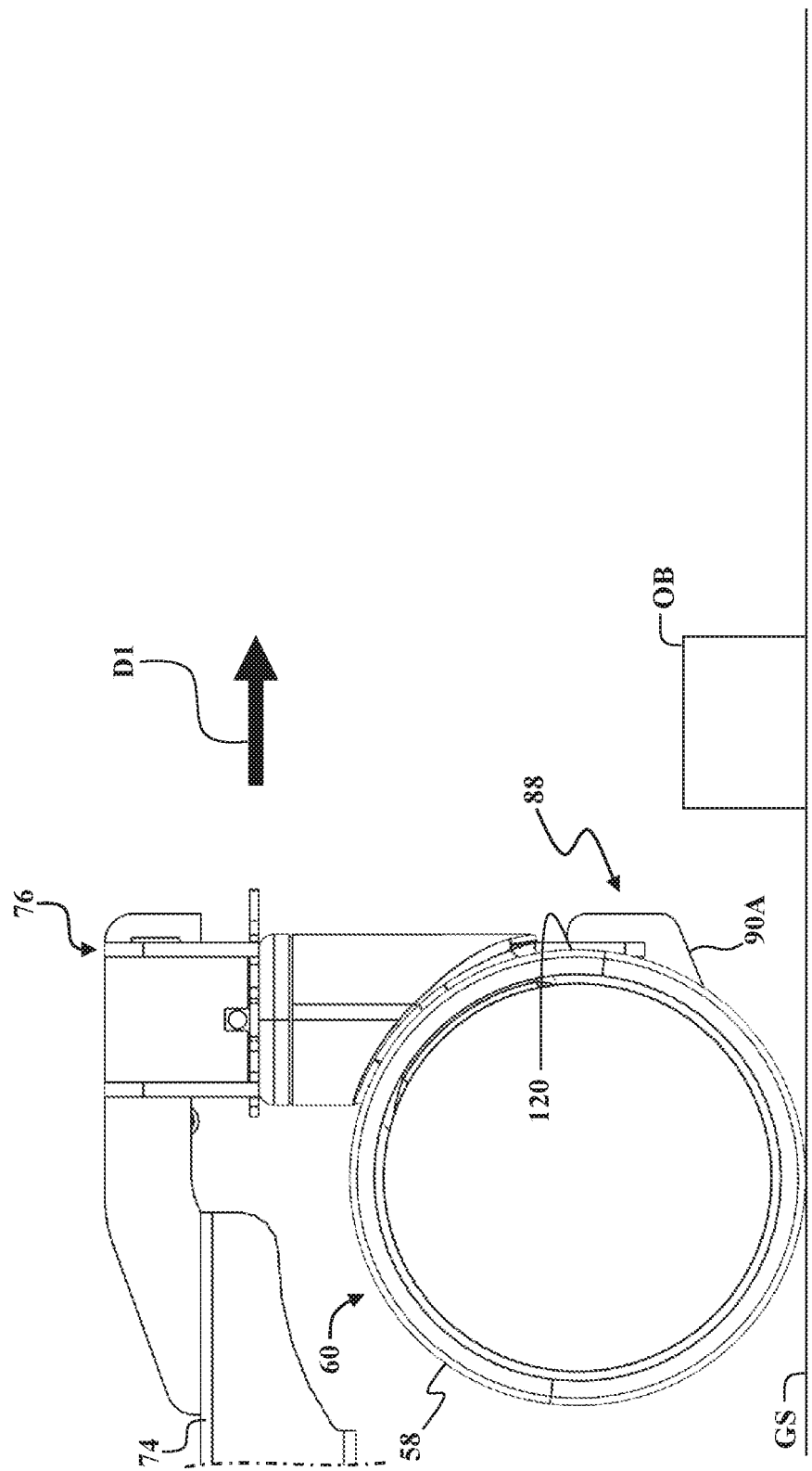
Figure 13C:
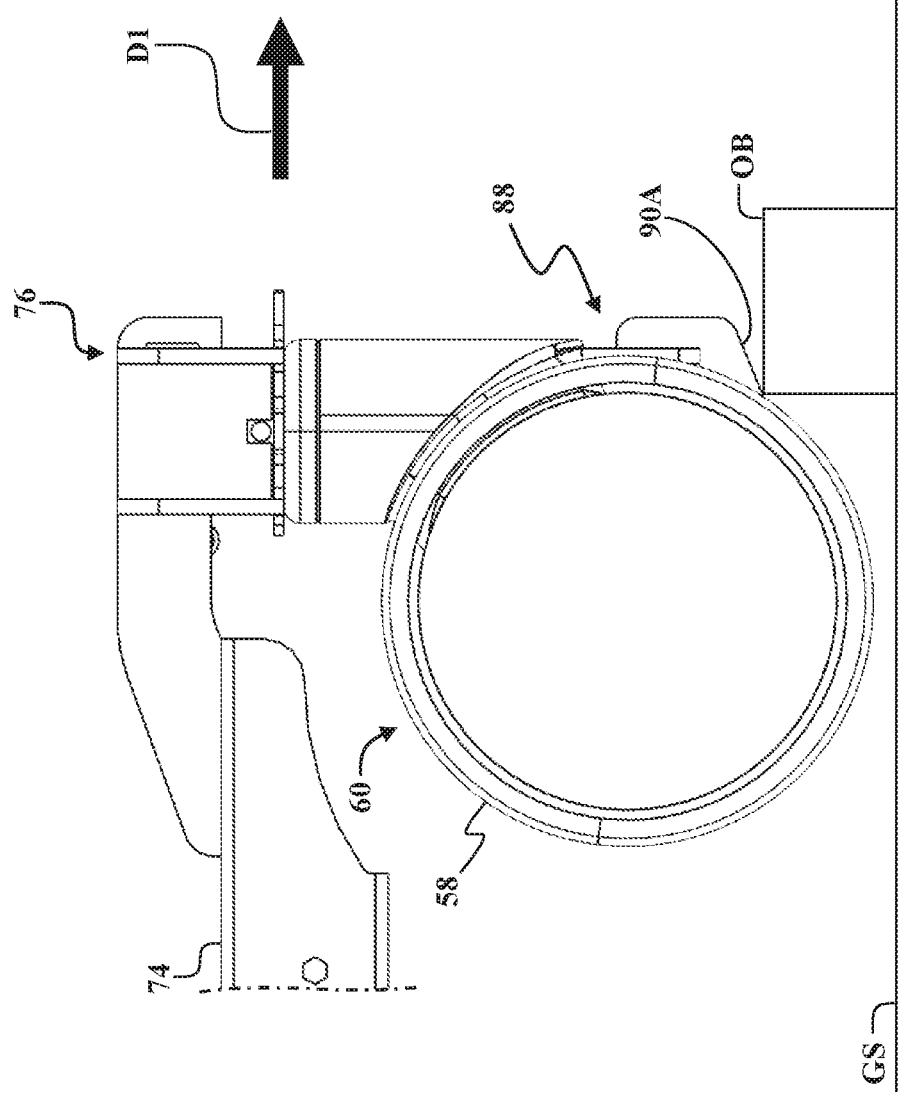
Figure 13D:
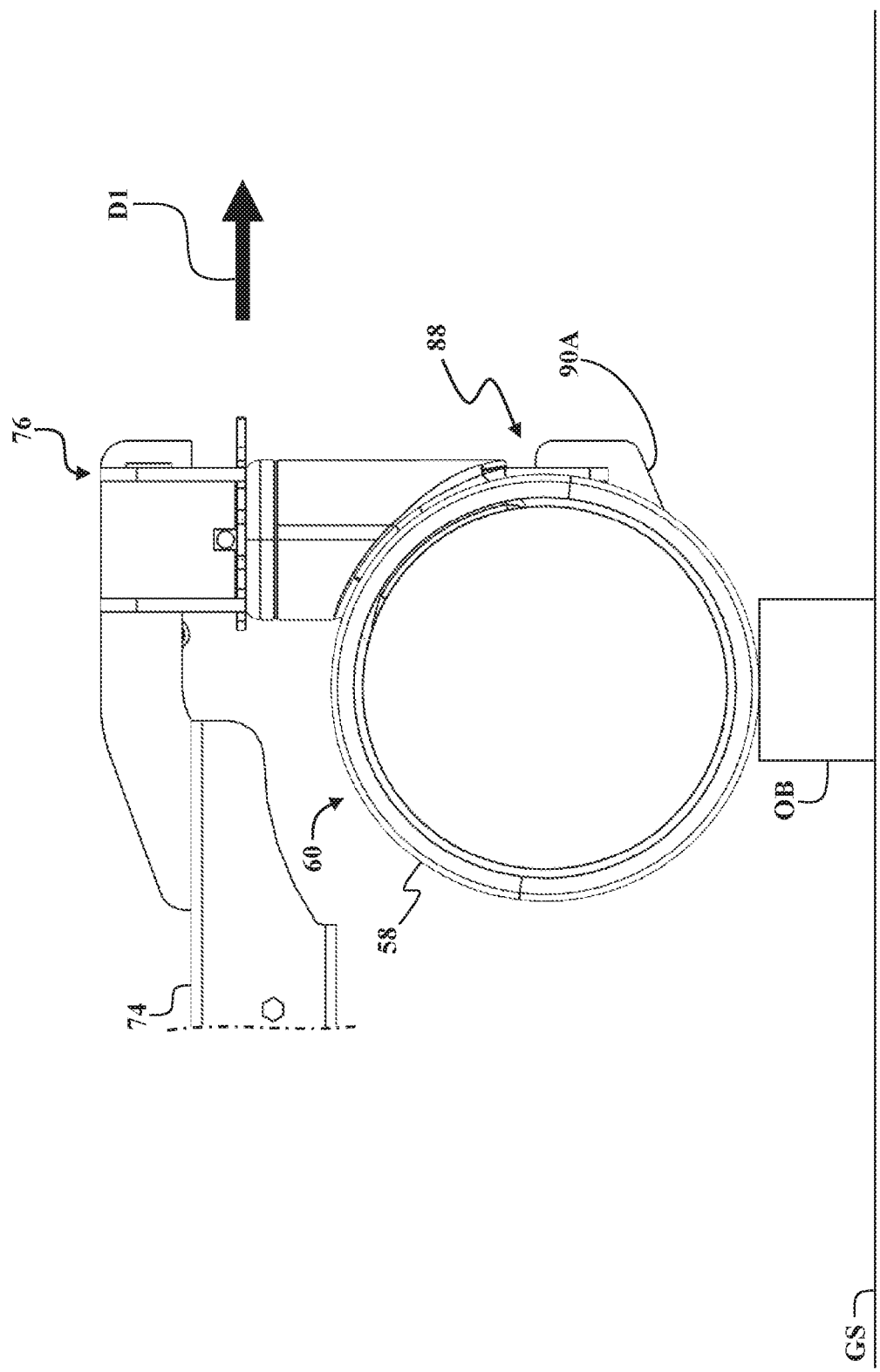
Figure 13F:
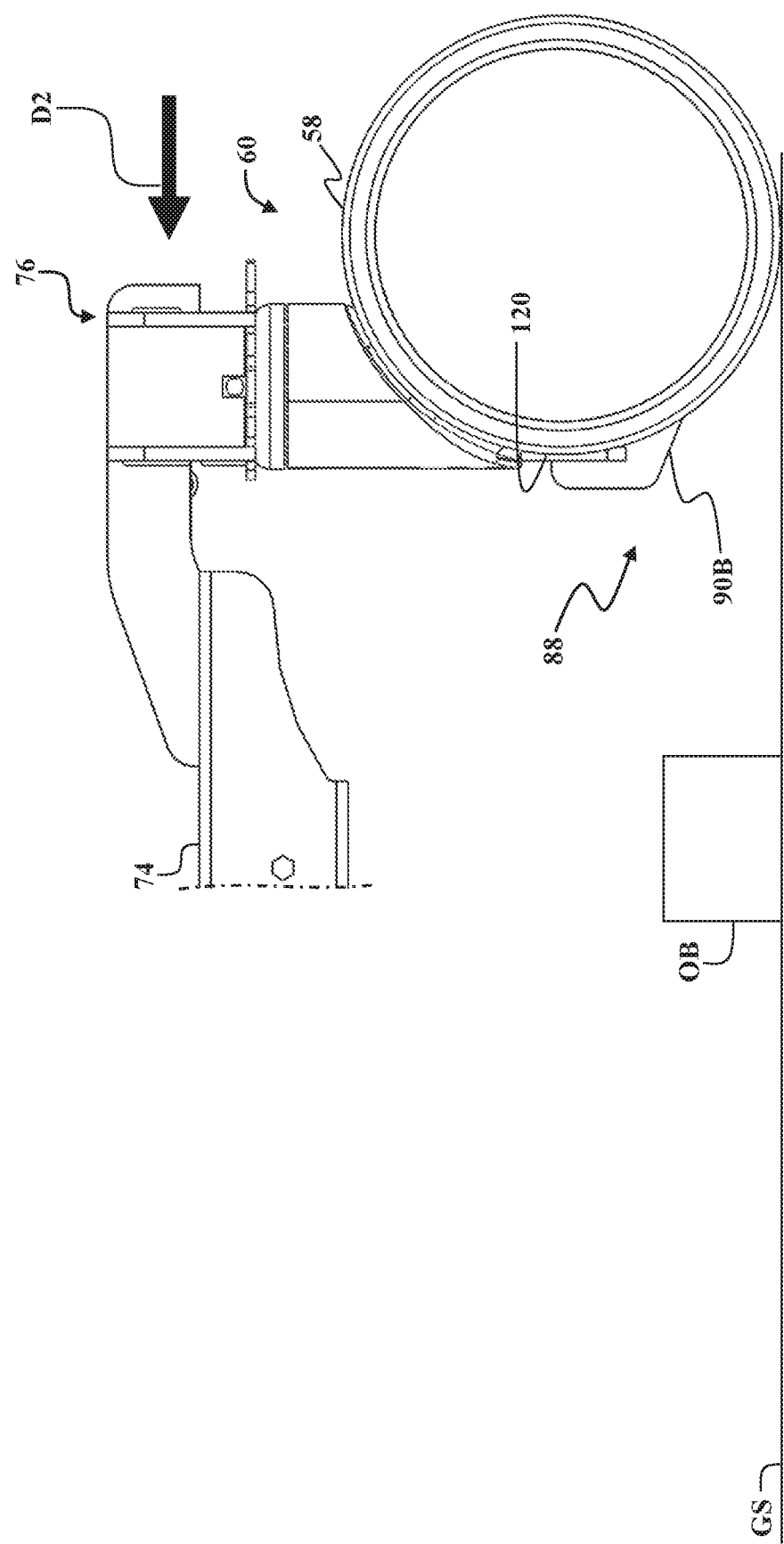
Figure 13G:
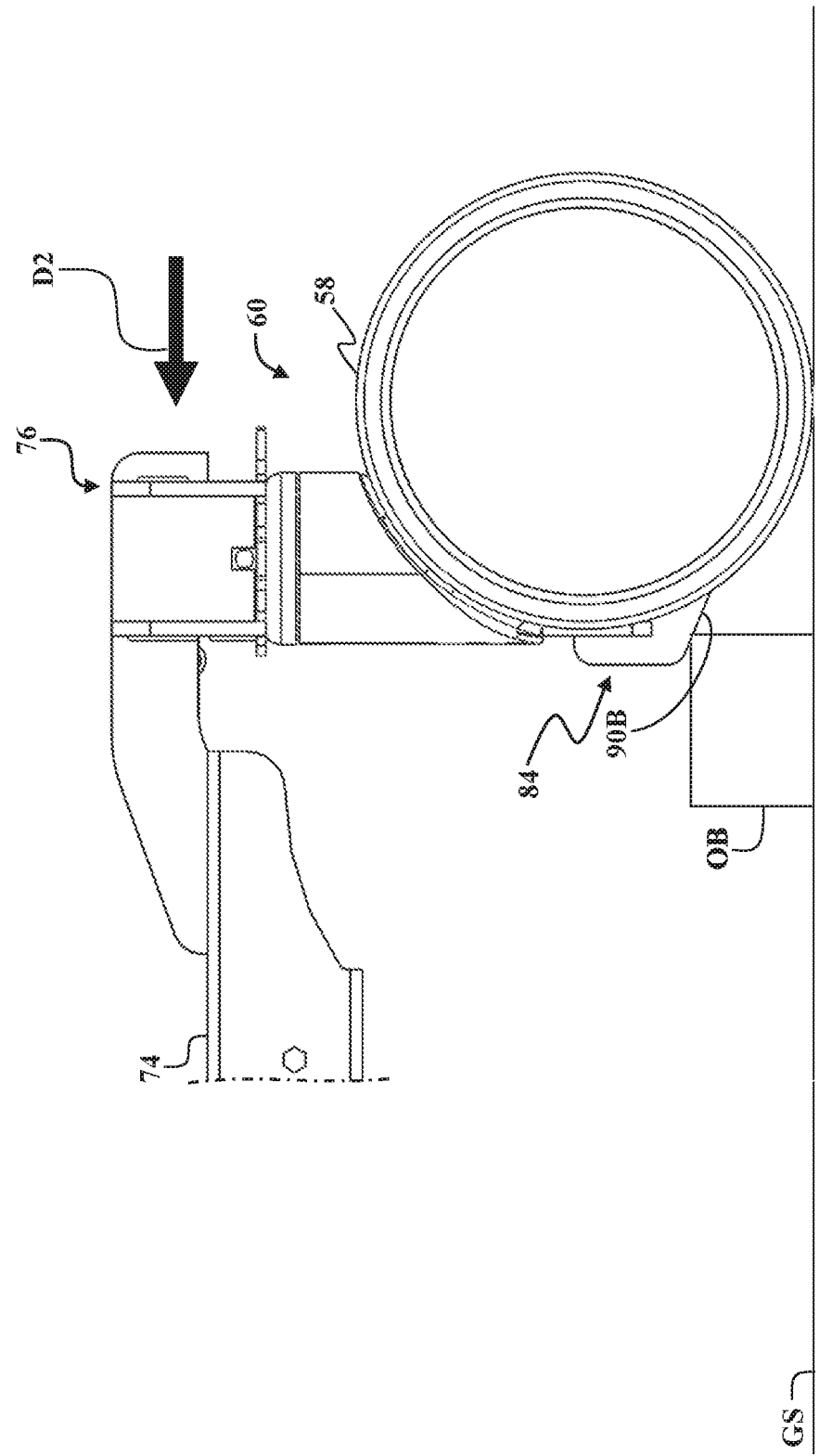
Figure 14:
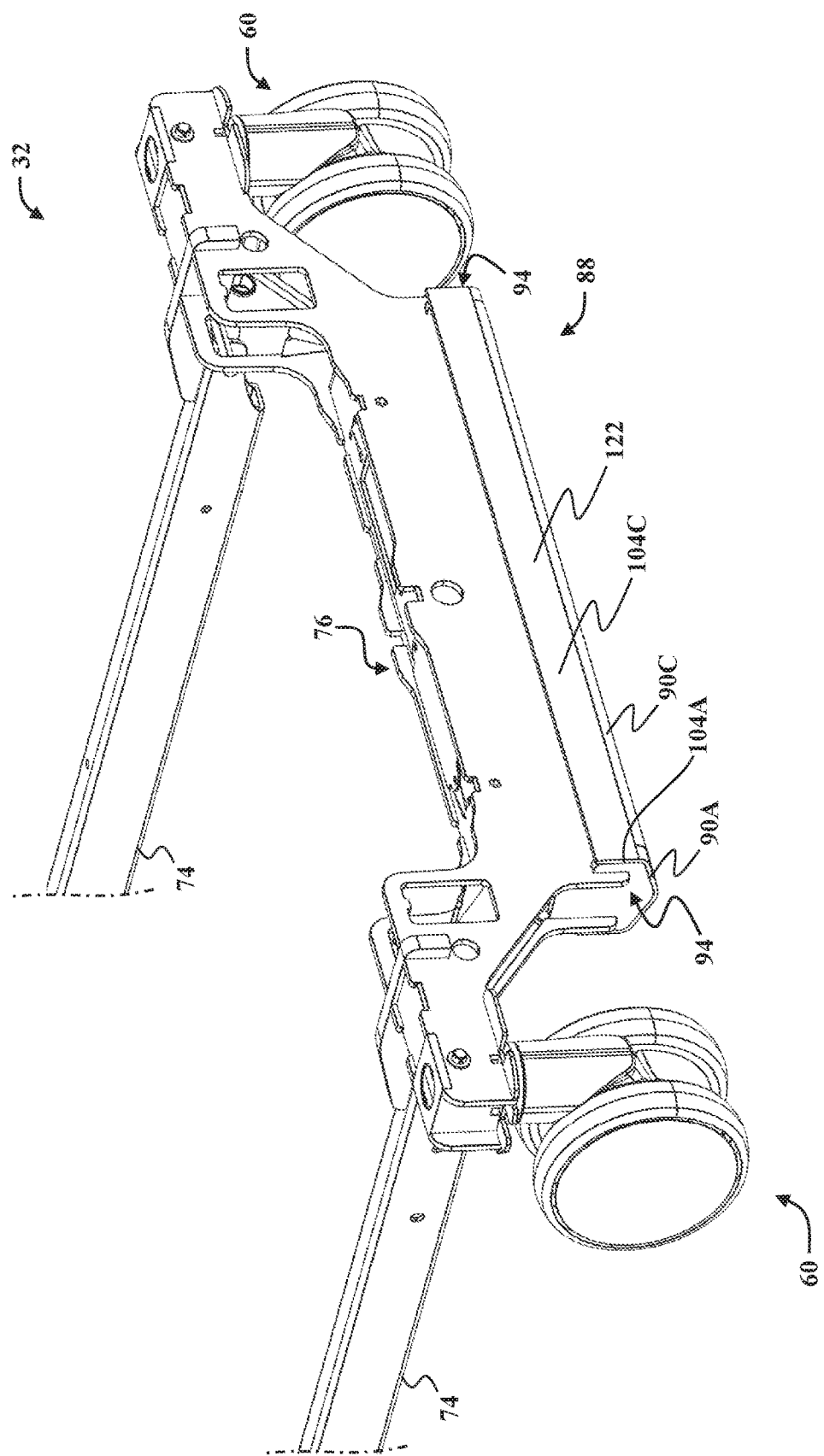
FIGS. 14-15 are enlarged perspective views of the support structure shown in FIGS. 3-4 illustrating the frame guard including a skid plate.

With reference to FIGS. 2-13G, each guard member 94 generally extends outwardly from the lower portion 84 of one of the cross support members 76 towards the ground surface GS, and generally includes a body portion 96 and a mounting portion 98 (see FIGS. 9-11). In some embodiments, the body portion 96 generally defines the first and second ramp surfaces 90A, 90B, and the mounting portion 98 is coupled to the cross support member 76.

As is best depicted in FIG. 11, the body portion 96 of the guard member 94 generally extends along the guard axis GA, and comprises first and second lateral faces 100A, 100B. Here, the first and second ramp surfaces 90A, 90B extend laterally between the first and second lateral faces 100A, 100B (see also FIG. 9) and have generally linear profiles. However, it will be appreciated that the first and/or second ramp surfaces 90A, 90B, as well as the first and/or second lateral faces 100A, 100B, could have other types of profiles, including without limitation curved profiles, compound profiles with linear and curved regions, and the like. The body portion 96 of the guard member 94 also defines an apex 102 that is intersected by the reference plane PN (and/or the guard axis GA) between the first and second ramp surfaces 90A, 90B. The apex 102 is defined by a generally rounded profile between and merging with both of the first and second ramp surfaces 90A, 90B, and likewise extends laterally between the first and second lateral faces 100A, 100B (see FIG. 9). However, it will be appreciated that other profiles are contemplated, and the apex 102 could be defined by a discrete point, edge, and the like. Here too, the body portion 96 of the guard member 94 comprises first and second wall surfaces 104A, 104B that likewise extend laterally between the first and second lateral faces 100A, 100B, and are arranged longitudinally further away from the guard axis GA than the first and second ramp surfaces 90A, 90B, respectively. Put differently, the first and second ramp surfaces 90A, 90B each extend at an angle from the apex 102 away from the guard axis GA to the corresponding first and second wall surfaces 104A, 104B, with a generally rounded chamfer (not shown in detail) merging or otherwise transitioning therebetween. In addition, the body portion 96 of the guard member 94 comprises first and second shoulder surfaces 106A, 106B arranged facing away from the apex 102 and disposed adjacent to the first and second wall surfaces 104A, 104B, respectively.

As is depicted in FIG. 11, in some embodiments, the various surfaces of the body portion 96 of the guard member 94 introduced above are "mirrored" about the guard axis GA. Here, the first and second angles 92A, 92B at which the first and second ramp surfaces 90A, 90B are arranged relative to the guard axis GA and are each oblique angles. Furthermore, the first and second angles 92A, 92B are substantially equal to each other. However, it will be appreciated that other configurations are contemplated.

As noted above, the mounting portion 98 of the guard member 94 is coupled to the cross support member 76 of the base 34. To this end, in the representative embodiments illustrated throughout the drawings, the mounting portion 98 of the guard member 94 comprises a tang 108 that extends from the body portion 96 adjacent to the first and second shoulder surfaces 106A, 106B. The tang 108 generally extends along the guide axis GA away from the body portion 96 to a mounting plate 110 which, in turn, extends at an angle from the tang 108. The tang 108 and the mounting plate 110 are shaped and arranged to facilitate attachment to the cross support member 76 (e.g., via welding), and cooperate with the body portion 96 to align the guard members 94 within the slots 85. More specifically, in the representative embodiments illustrated herein, each of the cross support members 76 comprises a pair of support plates 112 that are spaced longitudinally from each other to define a gap 114 therebetween (see FIG. 4). Here, the tang 108 and the mounting plate 110 of the mounting portion 98 of the guard member 94 are disposed within the gap 114 defined by the support plates 112 to facilitate mounting the guard member 94 to the cross support member 76. As is best shown in FIG. 6, the slots 85 are formed in the support plates 112 along the lower portion, and receive the guard member 94 therein so as to place the first and second lateral faces 100A, 100B into abutment with at least a portion of one or more of the slots 85 (see FIG. 4; not shown in detail). Here too in the illustrated embodiments, at least a portion of one or more of the first and second shoulder surfaces 106A, 106B is likewise disposed in abutment with at least a portion of one or more of the slots 85 (see FIG. 4; not shown in detail).

Referring now to FIG. 8, the first and second wall surfaces 104A, 104B are each spaced from the corresponding support plates 112 and a leading edge 120 of the wheel 58, and the apex 102 is spaced from the ground surface GS at a clearance distance 118, which may be adjusted to position the apex 102 for particular applications. In some embodiments, the clearance distance 118 could be configured such that the apex 102 is adjacent to the ground surface GS. Other configurations are contemplated. Here in FIG. 8, at least a portion of the first ramp surface 90A is situated beyond the leading edge 120 of the caster wheel 58 when the patient support apparatus 30 is moving in the first direction D1 (see FIG. 13A), and such that at least a portion of the second ramp surface 90B is situated beyond the leading edge 120 when the patient support apparatus 30 is moving in the second direction D2 (see FIG. 13F). Accordingly, an object OB positioned on the ground surface GS will engage one of the ramp surfaces 90A, 90B before engaging the caster wheel 58, as noted above. It will be appreciated that the first and second wall surfaces 104A, 104B are provided with a generally "flat" profile facing toward the first and second directions D1, D1, respectively. Here, it will be appreciated that the specific configuration of frame guard 88 (e.g., the body portion 96 of the guard member 94) may be optimized for particular applications, such as to accommodate traversing objects OB of different height thresholds based on where the first and second ramp surfaces 90A, 90B terminate at the first and second wall surfaces 104A, 104B. Furthermore, it is contemplated that the first and second wall surfaces 104A, 104B of one or more guard members 94 could be configured to promote interrupting motion of the patient transport apparatus 30 (e.g., as a "bumper") in response to engagement with relatively tall obstructions, objects OB, and the like, thereby affording further protection to the caster wheel assemblies 60. Thus, the first and second lateral faces 100A, 100B could be arranged "forward," "flush" or "backwards" of the leading edge 120 of the caster wheel 58. Other configurations are contemplated.

The guard member 94 may be fixedly coupled to the cross support member 76 (e.g., via welding, as noted above) or may be removably coupled to and/or adjustably positionable along the cross support member 76 and positionable. For example, the guard member 94 may be coupled to the cross support member 76 with an adjustable bolt, a positioning screw, and the like. Other configurations are contemplated.

As noted above, in some embodiments one or more guard members 94 serve as the frame guard 88 and define the first and second ramp surfaces 90A, 90B, such as is depicted in connection with FIGS. 2-13G. However, in some embodiments, the frame guard 88 may be realized in other ways. For example, in the representative embodiments illustrated in FIGS. 14-29, the frame guard 88 further comprises a skid plate, generally indicated at 122, that defines the first and second ramp surfaces which, for the purposes of clarity and consistency, are indicated with reference numerals 90C, 90D to differentiate from the first and second ramp surfaces 90A, 90B of the body portion 96 of the guard members 94 (see FIG. 17). As will be appreciated from the subsequent description below, the frame guard 88 could comprise any suitable quantity and/or arrangement of guard members 94 and/or skid plates 122 arranged outside of the range of pivoting motion of the caster wheel assemblies 60 without departing from the scope of the present disclosure.

Figure 17:
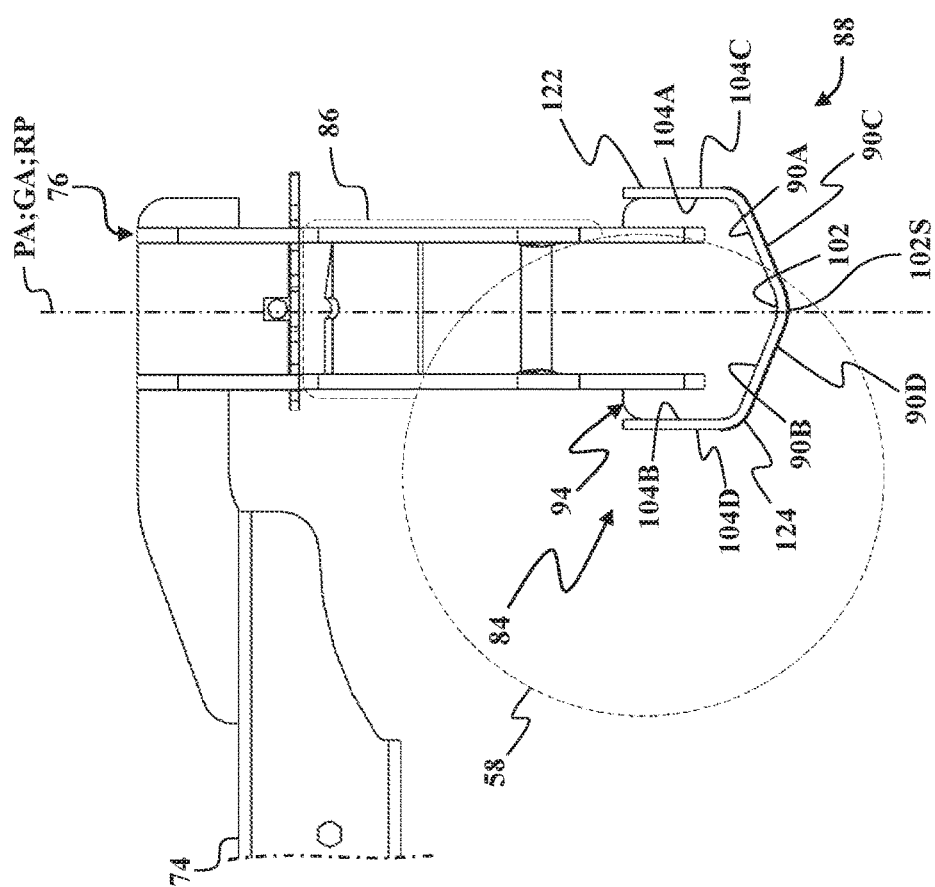
FIG. 17 is a side elevation view of the support structure shown in FIG. 14 with the caster wheel assembly shown in phantom.
Figure 18:
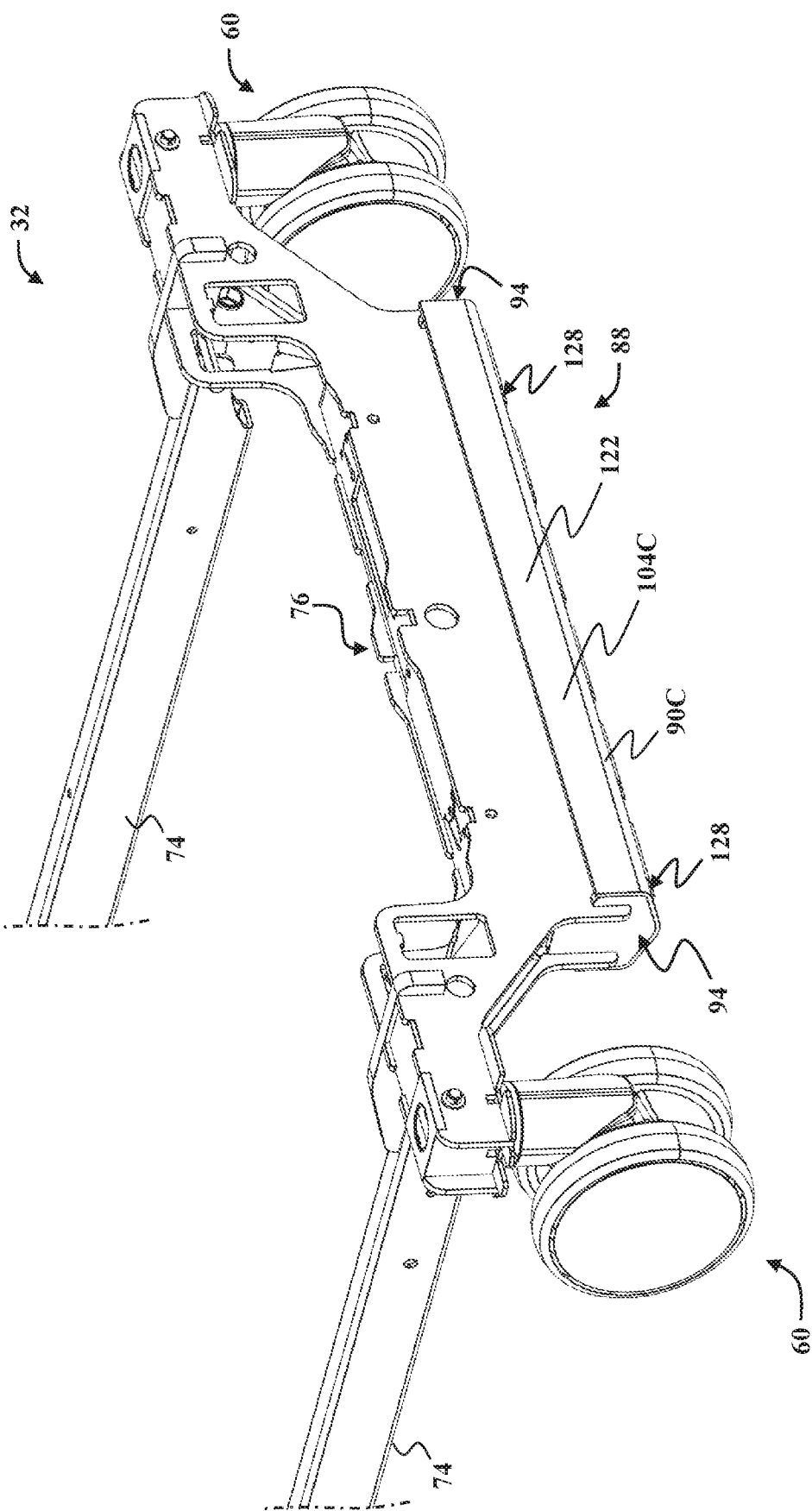
FIGS. 18-19 are enlarged perspective views of the support structure shown in FIGS. 14-15 illustrating the frame guard including a plurality of roller assemblies.
Figure 19:
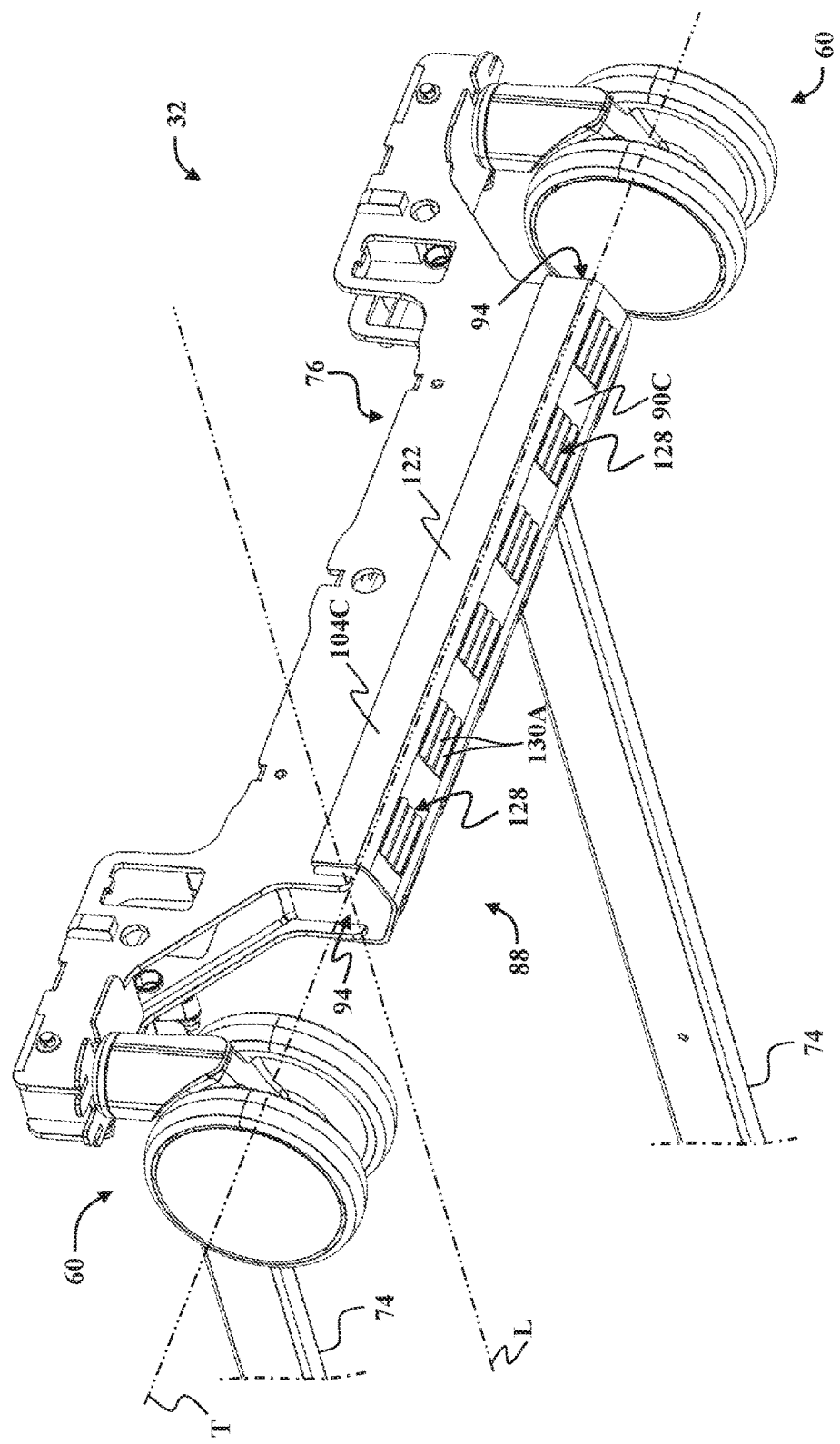
Figure 20:
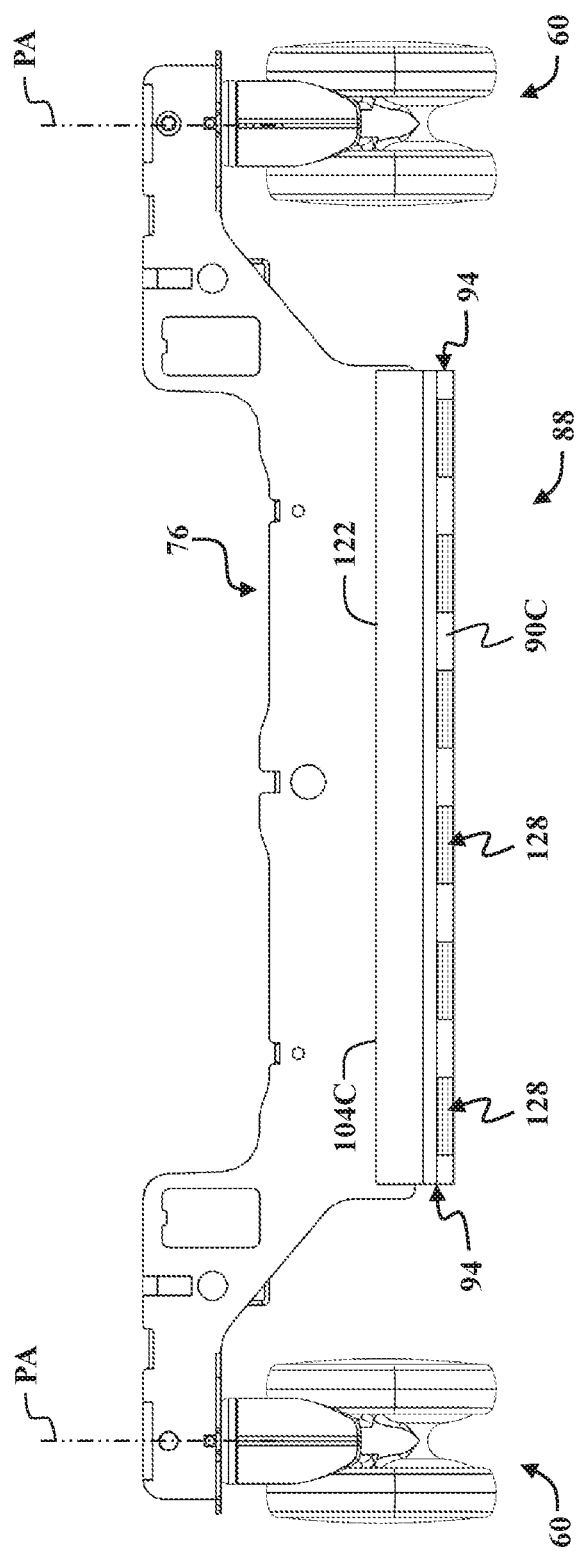
FIG. 20 is a front elevation view of the support structure shown in FIG. 18.
Figure 21:
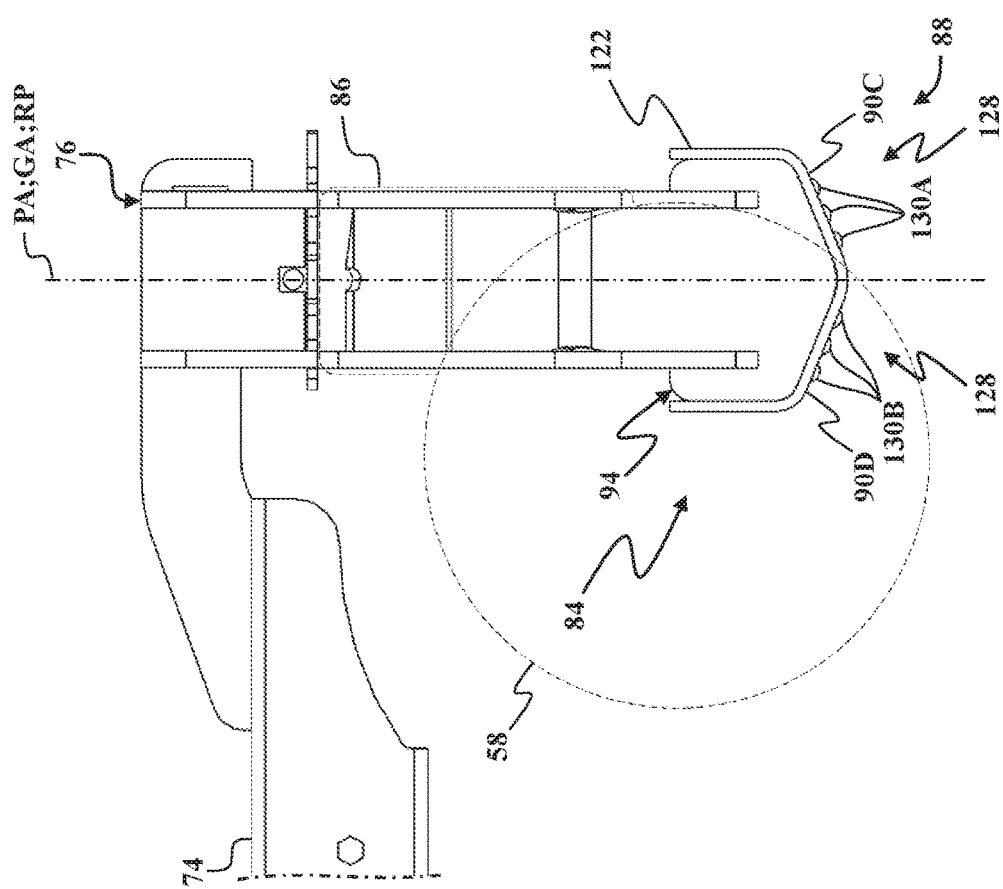
FIG. 21 is a side elevation view of the support structure shown in FIG. 18 with the caster wheel assembly shown in phantom.
Figure 22:
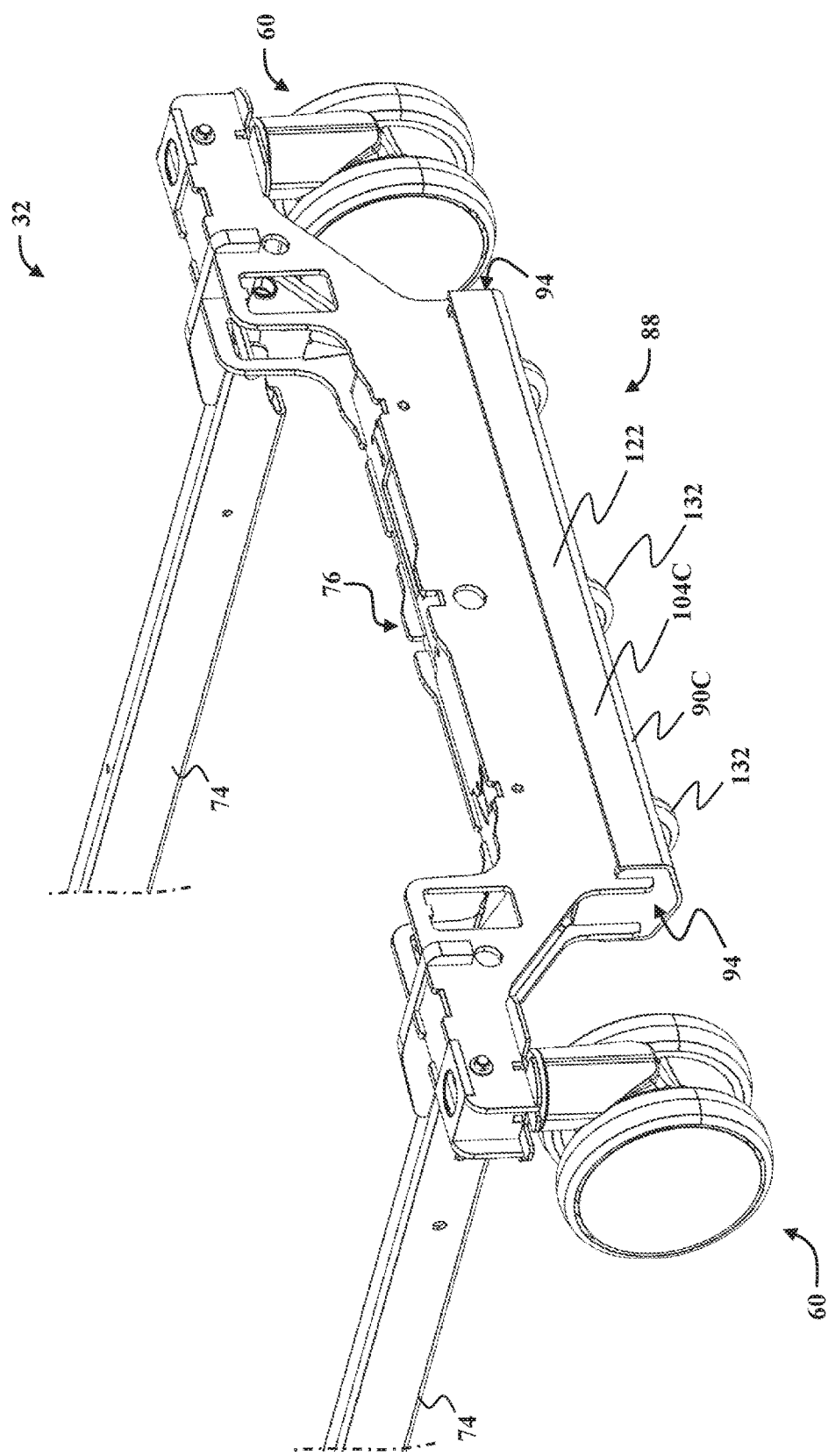
FIGS. 22-23 are enlarged perspective views of the support structure shown in FIGS. 14-15 illustrating the frame guard including a plurality of wheels.
Figure 23:
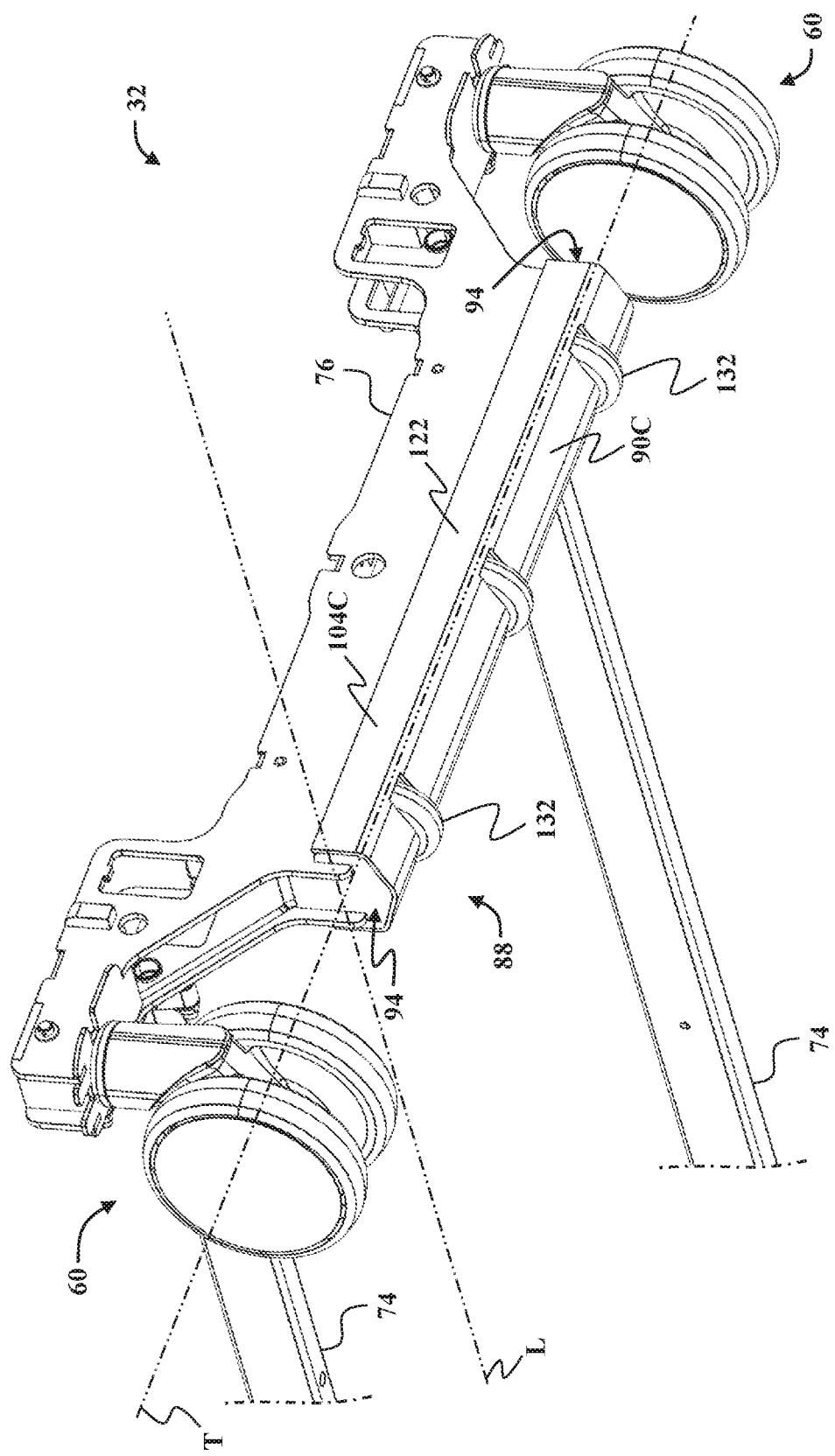
Figure 24:
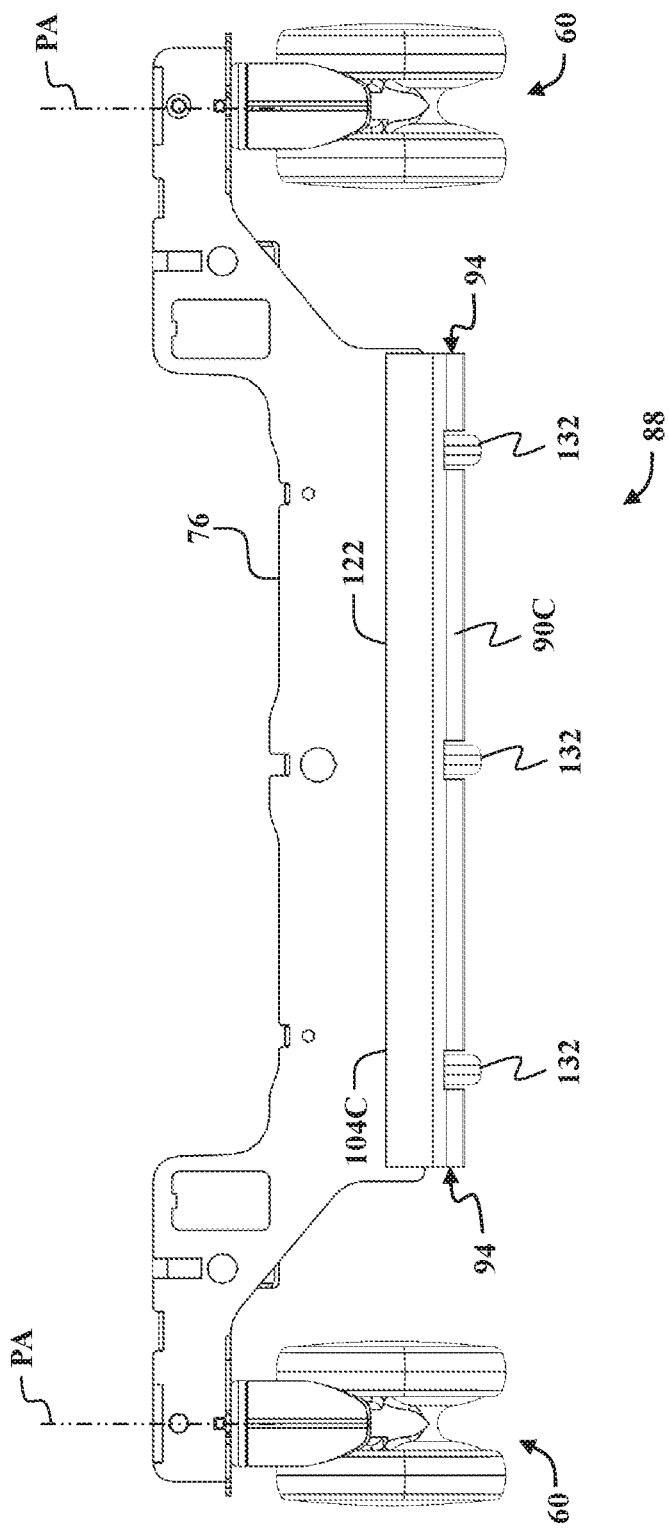
FIG. 24 is a front elevation view of the support structure shown in FIG. 22.

The skid plate 122 also defines first and second wall surfaces which, for the purposes of clarity and consistency, are indicated with reference numerals 104C, 104D to differentiate from the first and second wall surfaces 104A, 104B of the body portion 96 of the guard members 94 (see FIG. 17). Furthermore, the skid plate 122 also defines an apex which, for the purposes of clarity and consistency, is indicated with reference numeral 102S to differentiate from the apex 102 of the body portion 96 of the guard members (see FIG. 17). Here, and more specifically, the embodiments illustrated in FIGS. 14-29 employ skid plates 122 which extend laterally between pairs of guard members 94 of the type described above in connection with FIGS. 2-13G. Here, and as will be appreciated from the subsequent description below, the skid plates 122 may be coupled to the guard members 94 such as by welding, or may be removably attached to the guard members 94 or other parts of the base 34. It will be appreciated that skid plates 122 may be adjustable, serviceable, replaceable, and the like. Other configurations are contemplated.

Figure 15:
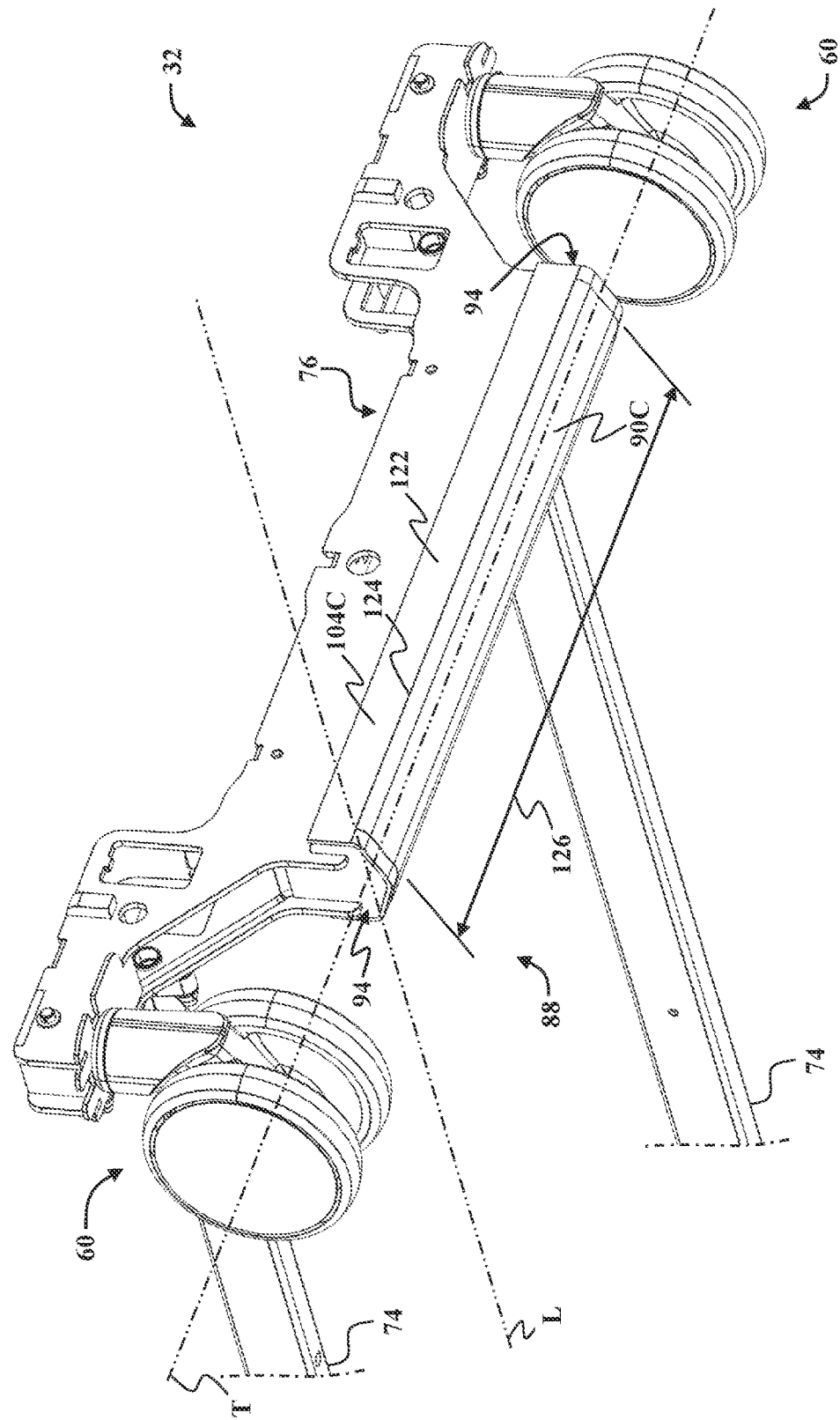
Figure 16:
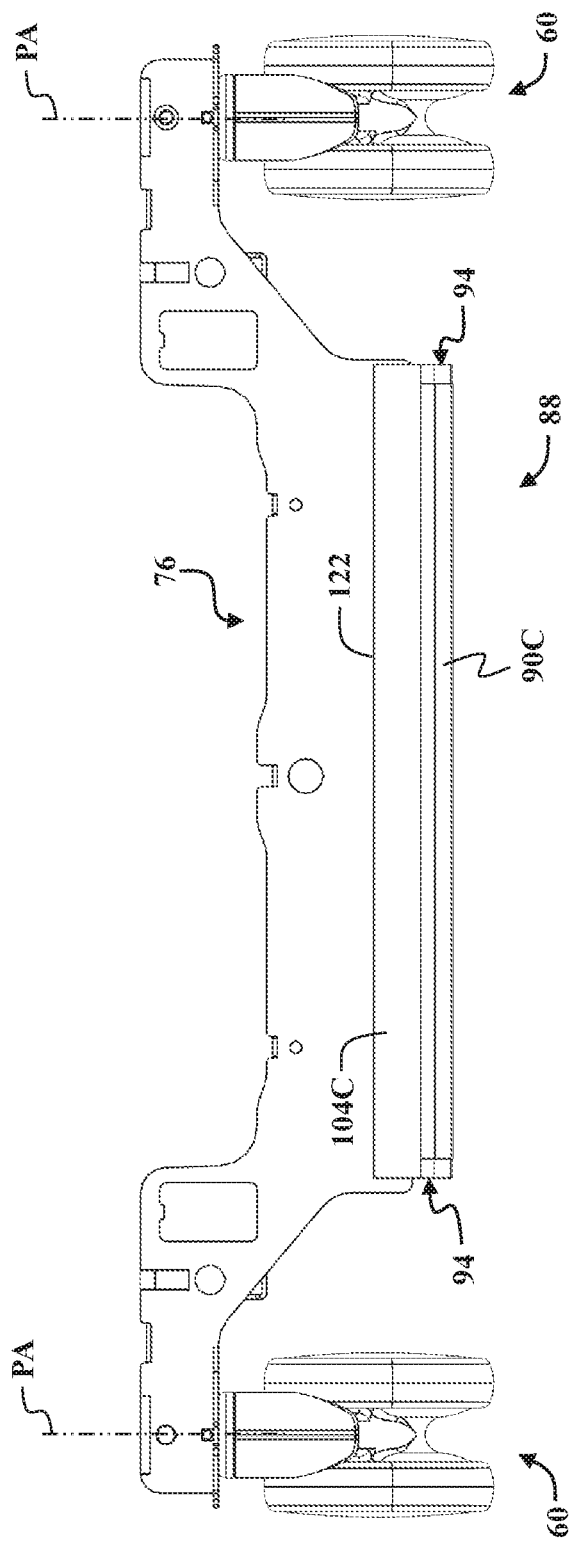
FIG. 16 is a front elevation view of the support structure shown in FIG. 14.

Referring now to FIGS. 14-17, the skid plate 122 has a profile that is substantially similar to the profile of the body portion 96 (see FIG. 9) of the guard members 94 (e.g., a "chevron" shape). The first and second ramped surfaces 90C, 90D, the first and second wall surfaces 104C, 104D, and the apex 102S of the skid plate 122 function similarly to the first and second ramped surfaces 90A, 90B, the first and second wall surfaces 104A, 104B, and the apex 102 of the guard members 94 described above. However, it will be appreciated that the skid plate 122 is significantly "wider" in the lateral direction than the body portion 96 of the guard members 94, which affords improved distribution of impact force in response to engagement with objects OB. Here too, the skid plate 122 may be advantageous for certain applications where commonly-traversed objects OB are sensitive to damage (e.g., doorsills manufactured from soft wood). Other configurations are contemplated. In some embodiments, the skid plate 122 (and/or other portions of the frame guard 88) may also include a wear pad 124 that is coupled to an outer surface the first and second ramp surfaces 90C, 90D. The wear pad 124 may also extend across the apex 102S, as well as to the first and second wall surfaces 104C, 104D. As shown in FIG. 15, the wear pad 124 may have a lateral length 126 which extends along one or more of the first and second ramp surfaces 90C, 90D between (or up to) lateral ends of the skid plate 122 (not shown in detail). The wear pad 124 may be of any suitable configuration, shape, profile, and the like, and may be realized with discrete sections, strips, bands, and the like arranged along the skid plate 122 in various ways.

In some embodiments, the wear pad 124 may comprise a low-friction coating such as, for example a Teflon™ coating, UHMW plastic, and/or any suitable anti-friction material. In some embodiments, the wear pad 124 may be realized as component (or, in some embodiments, a portion of the skid plate 122) that has been peened or otherwise finished to promote low-friction contact with objects OB, improve wear properties of the skid plate 122, and the like. Other configurations are contemplated. The wear pad 124 helps promote traversing and preventing damage to certain types of objects OB, and further contributes to protection of the caster wheel assemblies 60.

Referring now to FIGS. 18-21, in some embodiments, the frame guard 88 may further comprise at least one roller assembly, generally indicated at 128. The roller assembly 128 comprises a first plurality of rollers 130A each supported for rotation, disposed laterally between a pair of caster wheel assemblies 60, and arranged such that at least a portion of one or more of the first plurality of rollers 130A protrudes beyond the first ramp surface 90C (see FIG. 21). The roller assembly 128 also comprises a second plurality of rollers each supported for rotation, disposed laterally between a pair of caster wheel assemblies 60, and arranged such that at least a portion of one or more of the second plurality of rollers protrudes beyond the second ramp surface 90D (see FIG. 21). The roller assembly 128 helps promote traversing and preventing damage to certain types of objects OB, and further contributes to protection of the caster wheel assemblies 60. In some embodiments, the roller assemblies 128 may be removable, replaceable, serviceable, and the like, together with or separate from the skid plate 122. In the illustrated embodiment, the frame guard 88 employs a total of six discreet roller assemblies 128 distributed laterally along the skid plate 122, each of which has a total of six rollers 130A, 130B. However, it will be appreciated that other configurations are contemplated, and other arrangements of roller assemblies 128 and/or rollers 130A, 130B may be employed. Furthermore, while the rollers 130A, 130B are generally cylindrical in the illustrated embodiment, other configurations are contemplated, including without limitation rollers realized as "captured spherical bearings" operatively attached to the skid plate 122.

Figure 25:
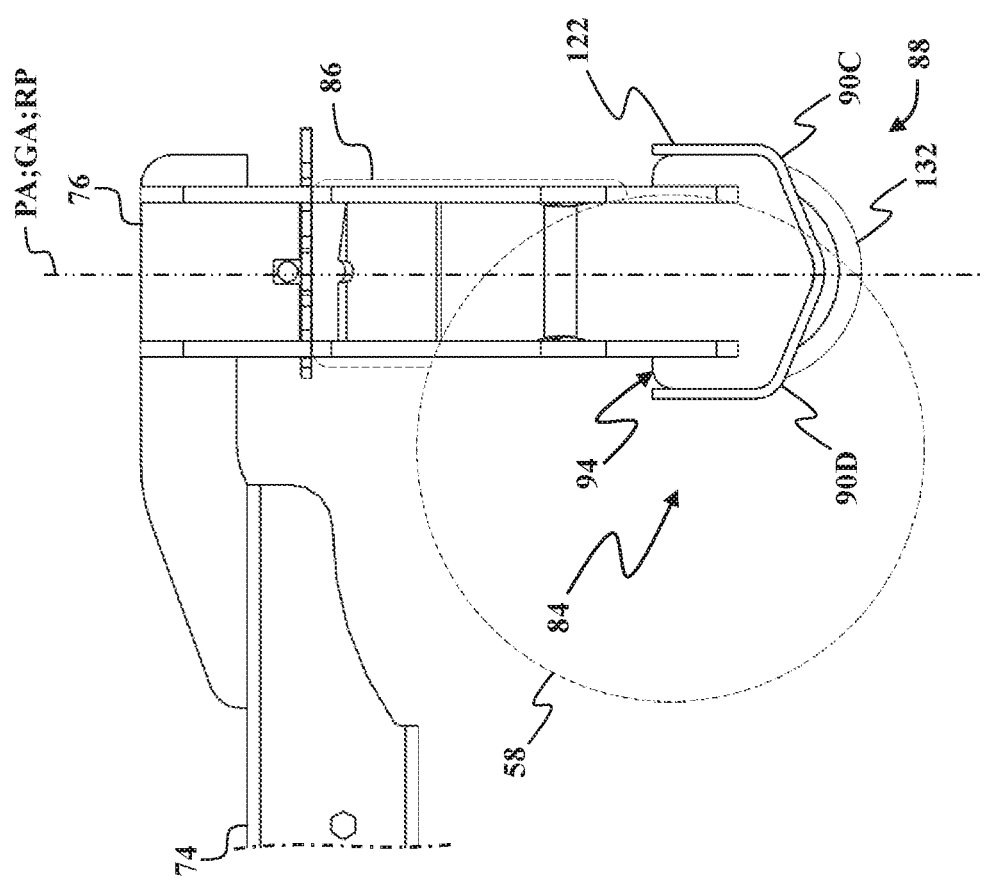
FIG. 25 is a side elevation view of the support structure shown in FIG. 22 with the caster wheel assembly shown in phantom.
Figure 26:
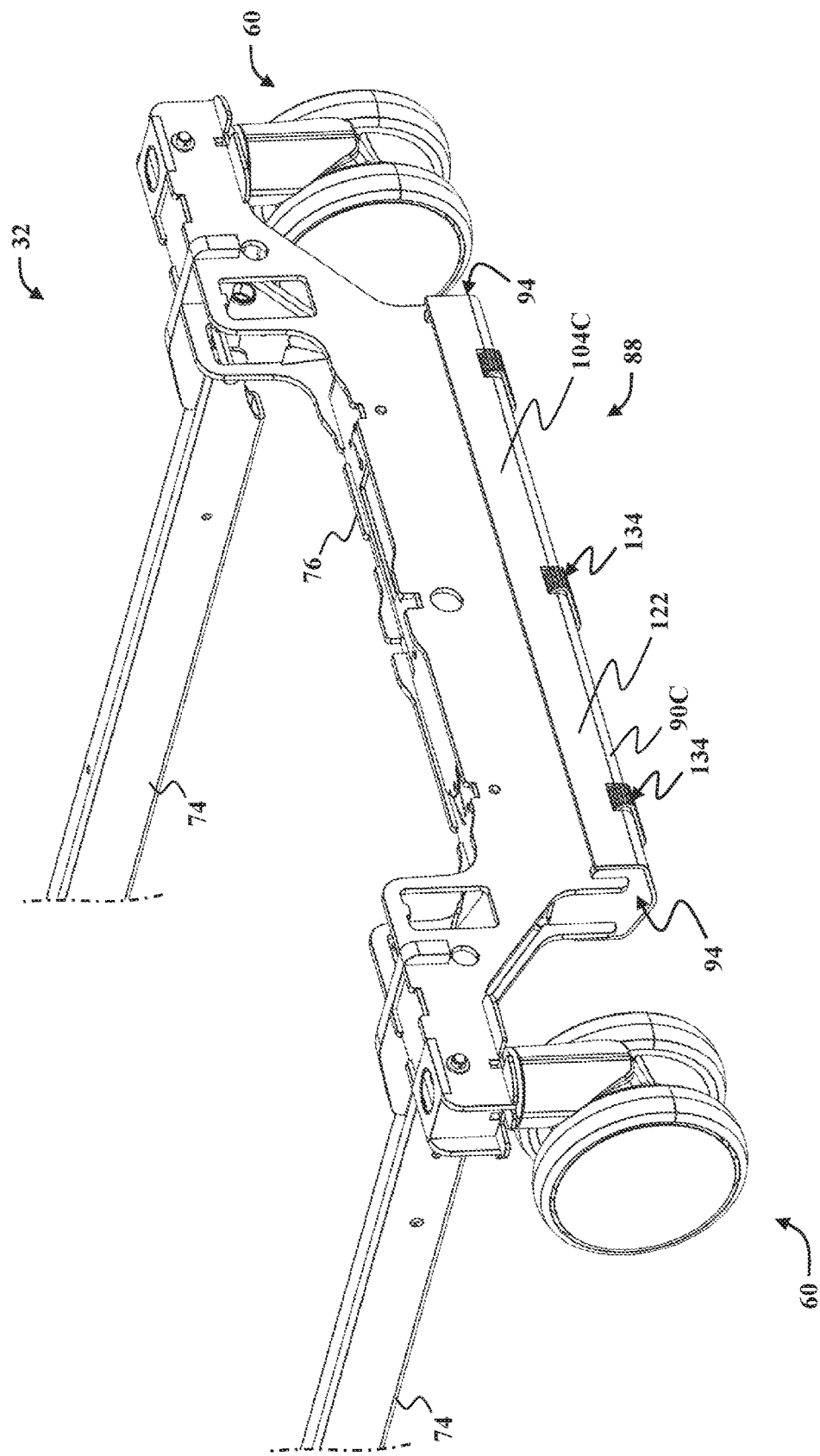
FIGS. 26-27 are enlarged perspective views of the support structure shown in FIGS. 14-15 illustrating the frame guard including a plurality of rolling track assemblies.
Figure 27:
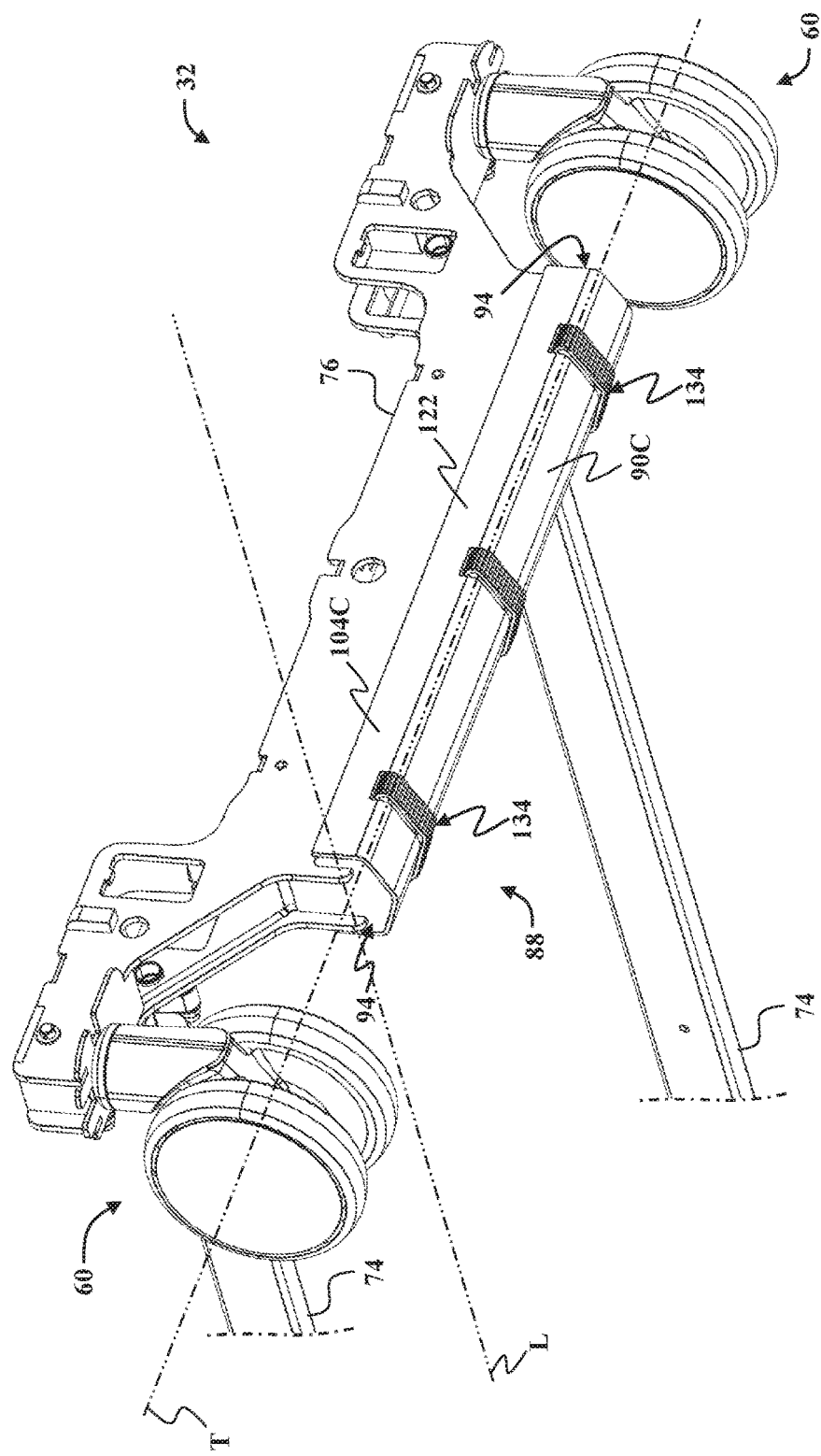
Figure 28:
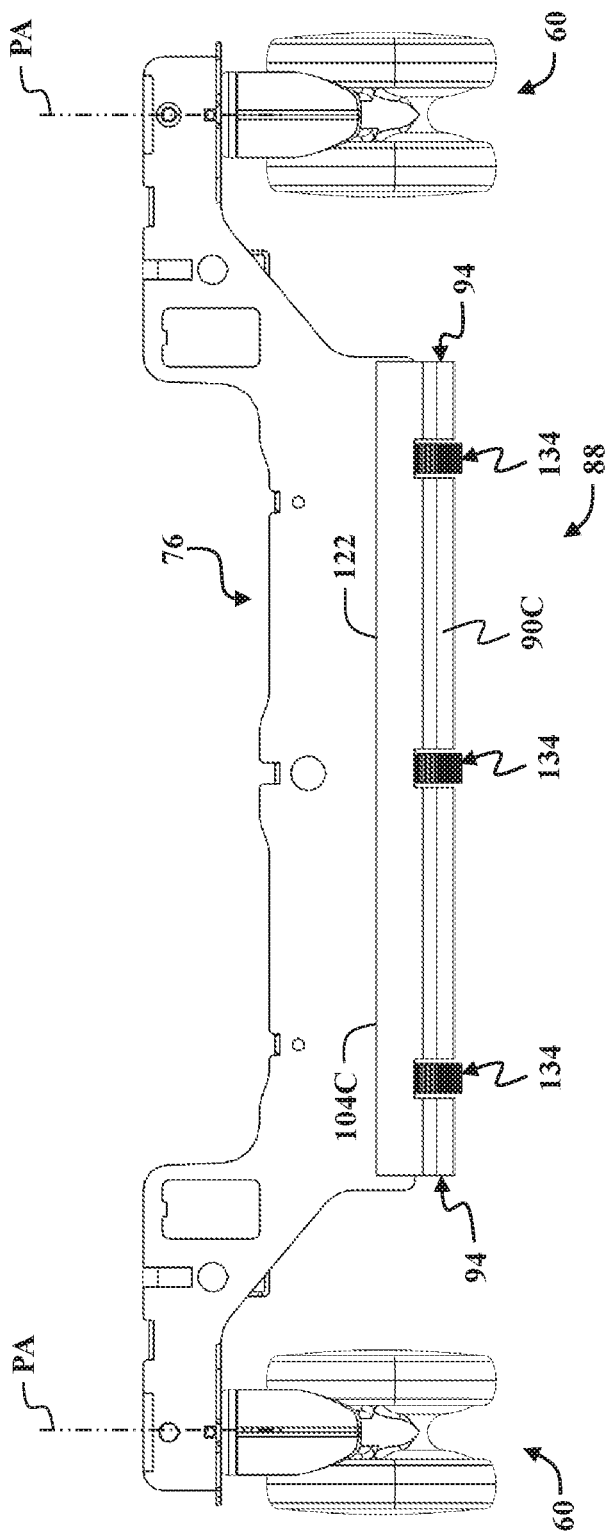
FIG. 28 is a front elevation view of the support structure shown in FIG. 26.
Figure 29:
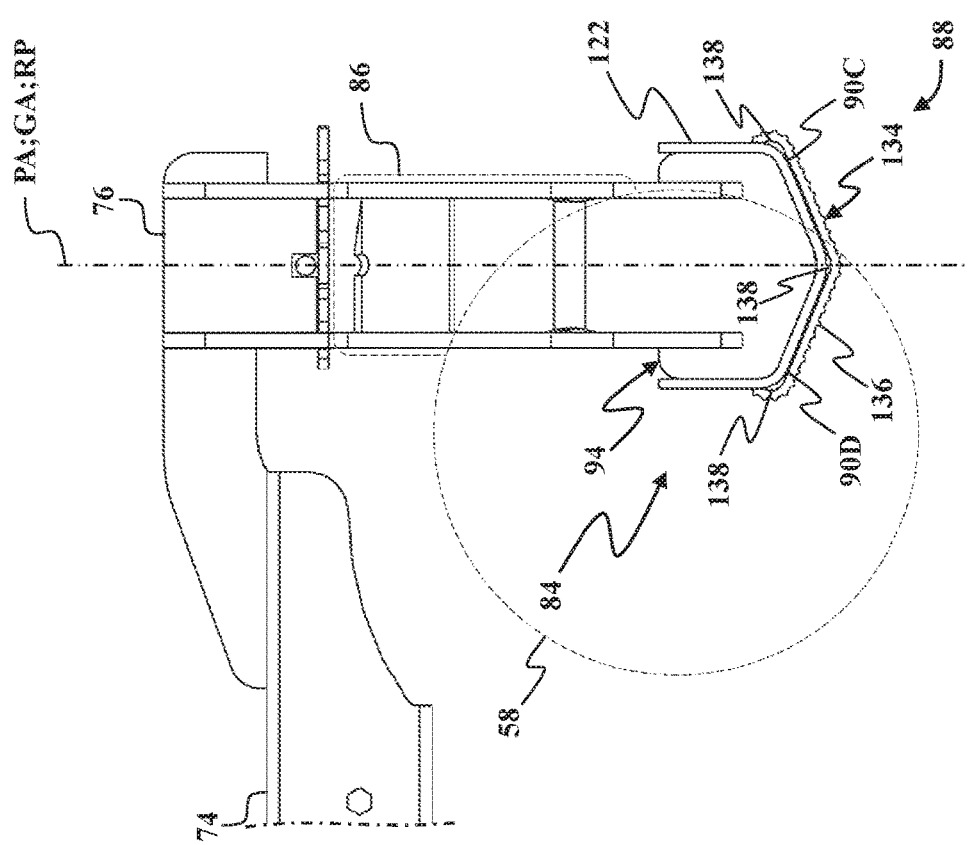
FIG. 29 is a side elevation view of the support structure shown in FIG. 26 with the caster wheel assembly shown in phantom.

Referring now to FIGS. 22-25, in some embodiments, the frame guard 88 may further comprise at least one intermediate wheel 132 supported for bi-directional rotation, disposed laterally between a pair of caster wheel assemblies 60, and arranged such that at least a portion of the intermediate wheel 132 protrudes beyond each of the first and second ramp surfaces 90C, 90D (see FIG. 25). The intermediate wheel 132 helps promote traversing and preventing damage to certain types of objects OB, and further contributes to protection of the caster wheel assemblies 60. In some embodiments, the intermediate wheels 132 may be removable, replaceable, serviceable, and the like, together with or separate from the skid plate 122. In the illustrated embodiment, the frame guard 88 employs a total of three discrete intermediate wheels 132 distributed laterally along the skid plate 122. However, it will be appreciated that other configurations are contemplated, and other arrangements of intermediate wheels 132 may be employed. In some embodiments, the intermediate wheels 132 could be of a relatively "soft" durometer, semi-rigid material (e.g., rubber, polyurethane, and the like) to help promote shock absorption in response to engagement with objects OB. In some embodiments, the intermediate wheels 132 could be relatively "wide" relative to their axis of rotation (e.g., wider than their outer diameter). Other configurations are contemplated.

Referring now to FIGS. 26-29, in some embodiments, the frame guard 88 may further comprise at least one track assembly, generally indicated at 134. The track assembly 134 comprises a track belt 136 supported for movement along a plurality of track rollers 138, is disposed laterally between a pair of caster wheel assemblies 60, and is arranged such that at least a portion of the track belt 136 protrudes beyond each of the first and second ramp surfaces 90C, 90D (see FIG. 29). The track assembly 134 helps promote traversing and preventing damage to certain types of objects OB, and further contributes to protection of the caster wheel assemblies 60. In some embodiments, the track assemblies 134 may be removable, replaceable, serviceable, and the like, together with or separate from the skid plate 122. In the illustrated embodiment, the frame guard 88 employs a total of three discreet track assemblies 134 distributed laterally along the skid plate 122, each of which has a total of three track rollers 138 and a single track belt 136. However, it will be appreciated that other configurations are contemplated, and other arrangements of track assemblies 134 may be employed. By way of non-limiting example, in some embodiments the track assemblies 134 could be "motor driven" (not shown) such that when the patient support apparatus 30 approaches an object OB at an intentionally slow and controlled rate of speed (e.g., along the first direction D1), upon contact with the object OB the track belts 136 could be driven so as to "pull" the and drive the patient support apparatus 30 up and over the object OB. Other configurations are contemplated.

Those having ordinary skill in the art will appreciate that various configurations of frame guards 88 could be utilized based on aspects of one or more of the embodiments disclosed herein. By way of non-limiting example, frame guards 88 may comprise guard members 94, skid plates 122, wear pads 124, roller assemblies 128, intermediate wheels 132, and/or track assemblies 134 of various arrangements, styles, and configurations consistent with the present disclosure.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for traversing objects supported on ground surfaces, said patient support apparatus comprising:
   a patient support deck for supporting a patient;
   a base configured to support said patient support deck from the ground surface;
   a plurality of caster wheel assemblies including at least one pair of caster wheel assemblies spaced laterally from each other and coupled to said base for pivoting movement about respective vertical pivot axes cooperating to define a reference plane, each of said pair of caster wheel assemblies comprising a respective caster wheel supported for rotation about a respective rotational axis arranged orthogonal to the respective vertical pivot axis of said caster wheel assembly when traversing across the ground surface; and
   a frame guard coupled to said base, spaced laterally between said pair of caster wheel assemblies, and defining first and second ramp surfaces each disposed at an angle relative to said reference plane, with said first ramp surface arranged to engage an object supported on the ground surface before the object contacts one or more of said caster wheels of said pair of caster wheel assemblies when said patient support apparatus moves in a first direction, and with said second ramp surface arranged to engage the object supported on the ground surface before the object contacts one or more of said caster wheels of said pair of caster wheel assemblies when said patient support apparatus moves in a second direction opposite to said first direction.

2. The patient support apparatus as set forth in claim 1, wherein said frame guard comprises a guard member arranged between said pair of caster wheel assemblies.

3. The patient support apparatus as set forth in claim 2, wherein said guard member defines said first and second ramp surfaces.

4. The patient support apparatus as set forth in claim 2, wherein said guard member is arranged adjacent to one of said pair of caster wheel assemblies.

5. The patient support apparatus as set forth in claim 1, wherein said frame guard comprises a pair of guard members spaced from each other and arranged between said pair of caster wheel assemblies.

6. The patient support apparatus as set forth in claim 5, wherein each of said pair of guard members is arranged adjacent to a corresponding one of said pair of caster wheel assemblies.

7. The patient support apparatus as set forth in claim 5, wherein said frame guard further comprises a skid plate coupled to and extending between said pair of guard members, said skid plate defining said first and second ramp surfaces.

8. The patient support apparatus as set forth in claim 7, wherein said skid plate includes a wear pad coupled to at least one of said first and second ramp surfaces; and
wherein said wear pad comprises a low-friction coating.

9. The patient support apparatus as set forth in claim 7, wherein said frame guard further comprises at least one roller assembly comprising:
a first plurality of rollers each supported for rotation, disposed between said pair of caster wheel assemblies, and arranged such that at least a portion of one or more of said first plurality of rollers protrudes beyond said first ramp surface; and
at second plurality of rollers each supported for rotation, disposed between said pair of caster wheel assemblies, and arranged such that at least a portion of one or more of said second plurality of rollers protrudes beyond said second ramp surface.

10. The patient support apparatus as set forth in claim 7, wherein said frame guard further comprises at least one intermediate wheel supported for rotation, disposed between said pair of caster wheel assemblies, and arranged such that at least a portion of said at least one intermediate wheel protrudes beyond each of said first and second ramp surfaces.

11. The patient support apparatus as set forth in claim 7, wherein said frame guard further comprises at least one track assembly having a track belt supported for movement along a plurality of track rollers, said track assembly being disposed between said pair of caster wheel assemblies and arranged such that at least a portion of said track belt protrudes beyond each of said first and second ramp surfaces.

12. The patient support apparatus as set forth in claim 1, wherein said first ramp surface of said frame guard is disposed at a first angle relative to said reference plane;
wherein said second ramp surface of said frame guard is disposed at a second angle relative to said reference plane; and
wherein said first angle and said second angle are each oblique.

13. The patient support apparatus as set forth in claim 1, wherein said first ramp surface of said frame guard is arranged so as to be substantially tangential to one of said caster wheels of said pair of caster wheel assemblies when said patient support apparatus moves in said first direction.

14. The patient support apparatus as set forth in claim 1, wherein said frame guard comprises a skid plate spaced from and extending between said pair of caster wheel assemblies, with said skid plate defining said first and second ramp surfaces.

15. The patient support apparatus as set forth in claim 1, wherein said base comprises first and second longitudinal support members and first and second cross support members; and wherein said plurality of caster wheel assemblies is further defined as:
a first pair of caster wheel assemblies spaced laterally from each other and coupled to said first cross support member for pivoting movement about respective first vertical pivot axes cooperating to define a first reference plane, each of said first pair of caster wheel assemblies comprising a respective first caster wheel supported for rotation about a respective first rotational axis arranged orthogonal to the respective first vertical pivot axis of said caster wheel assembly of said first pair of caster wheel assemblies when traversing across the ground surface, and
a second pair of caster wheel assemblies spaced laterally from each other and coupled to said second cross support member for pivoting movement about respective second vertical pivot axes cooperating to define a second reference plane, each of said second pair of caster wheel assemblies comprising a respective second caster wheel supported for rotation about a respective second rotational axis arranged orthogonal to the respective second vertical pivot axis of said caster wheel assembly of said second pair of caster wheel assemblies when traversing across the ground surface.

16. The patient support apparatus as set forth in claim 15, wherein said frame guard is further defined as a first frame guard coupled to said first cross support member and defining said first and second ramp surfaces of said first frame guard relative to said first reference plane, with said first ramp surface of said first frame guard arranged to engage the object supported on the ground surface before the object contacts one or more of said caster wheels of said first pair of caster wheel assemblies when said patient support apparatus moves in the first direction, and with said second ramp surface of said first frame guard arranged to engage the object supported on the ground surface before the object contacts one or more of said caster wheels of said first pair of caster wheel assemblies when said patient support apparatus moves in the second direction; and
further comprising a second frame guard coupled to said second cross support member and defining first and second ramp surfaces of said second frame guard each disposed at an angle relative to said second reference plane, with said first ramp surface of said second frame guard arranged to engage the object supported on the ground surface before the object contacts one or more of said caster wheels of said second pair of caster wheel assemblies when said patient support apparatus moves in the first direction, and with said second ramp surface of said second frame guard arranged to engage the object supported on the ground surface before the object contacts one or more of said caster wheels of said second pair of caster wheel assemblies when said patient support apparatus moves in the second direction.

17. The patient support apparatus as set forth in claim 1, wherein said base comprises a cross support member extending between a pair of longitudinal support members; and
wherein said frame guard comprises a guard member coupled to said cross support member and arranged between said pair of caster wheel assemblies.

18. The patient support apparatus as set forth in claim 17, wherein said guard member defines said first and second ramp surfaces and an apex arranged between said first and second ramp surfaces, wherein said apex of said guard member is spaced from the ground surface at a clearance distance.

19. The patient support apparatus as set forth in claim 18, wherein said guard member comprises:
- a body portion defining said first and second ramp surfaces, and
- a mounting portion coupled to said cross support member;
- wherein said cross support member includes a pair of support plates spaced longitudinally from each other to define a gap therebetween; and
- wherein said mounting portion of said guard member comprises a tang extending from said body portion and disposed within said gap to facilitate coupling said guard member to said cross support member.

20. The patient support apparatus as set forth in claim 19, wherein said pair of support plates each comprise a respective lower portion with a slot defined therein;
- wherein said body portion of said guard member further comprises opposing lateral faces, with said first and second ramp surfaces extending between said opposing lateral faces;
- wherein at least a portion of one or more of said opposing lateral faces is disposed in abutment with at least a portion of one or more of said slots;
- wherein said body portion of said guard member further comprises first and second wall surfaces extending between said opposing lateral faces and arranged longitudinally further away from said reference plane than said first and second ramp surfaces, respectively;
- wherein said body portion of said guard member further comprises first and second shoulder surfaces arranged facing away from said apex and disposed adjacent to said first and second wall surfaces, respectively; and
- wherein at least a portion of one or more of said first and second shoulder surfaces is disposed in abutment with at least a portion of one or more of said slots.

* * * * *